US008312087B2

(12) United States Patent
Svendsen et al.

(10) Patent No.: US 8,312,087 B2
(45) Date of Patent: Nov. 13, 2012

(54) FACEMAIL

(75) Inventors: Hugh Svendsen, Chapel Hill, NC (US); Scott Curtis, Durham, NC (US)

(73) Assignee: Kota Enterprises, LLC, Wilmington, DE (US)

( * ) Notice: Subject to any disclaimer, the term of this patent is extended or adjusted under 35 U.S.C. 154(b) by 556 days.

(21) Appl. No.: 12/111,456

(22) Filed: Apr. 29, 2008

(65) Prior Publication Data

US 2009/0271484 A1  Oct. 29, 2009

(51) Int. Cl.
   *G06F 15/16* (2006.01)
   *G06K 9/00* (2006.01)
(52) U.S. Cl. .......... 709/206; 382/118; 382/181
(58) Field of Classification Search .......... 709/202, 709/203, 204, 205, 206, 223–226; 382/181
   See application file for complete search history.

(56) References Cited

U.S. PATENT DOCUMENTS

| | | | | |
|---|---|---|---|---|
| 6,038,333 | A * | 3/2000 | Wang | 382/118 |
| 7,188,139 | B1 * | 3/2007 | Ayatsuka et al. | 709/204 |
| 7,203,759 | B1 * | 4/2007 | Ostermann et al. | 709/231 |
| 2002/0115445 | A1 * | 8/2002 | Myllymaki | 455/456 |
| 2002/0183112 | A1 | 12/2002 | Emmerson et al. | |
| 2004/0235460 | A1 | 11/2004 | Engstrom et al. | |
| 2004/0243671 | A9 * | 12/2004 | Needham et al. | 709/204 |
| 2005/0054352 | A1 | 3/2005 | Karaizman | |
| 2005/0191963 | A1 | 9/2005 | Hymes | |
| 2005/0280502 | A1 * | 12/2005 | Bell | 340/5.83 |
| 2006/0074750 | A1 | 4/2006 | Clark et al. | |
| 2006/0167944 | A1 | 7/2006 | Baker | |
| 2006/0224680 | A1 * | 10/2006 | Terayoko | 709/206 |
| 2006/0251338 | A1 * | 11/2006 | Gokturk et al. | 382/305 |
| 2006/0256959 | A1 * | 11/2006 | Hymes | 379/433.04 |
| 2007/0031800 | A1 * | 2/2007 | Solomon | 434/322 |
| 2008/0032277 | A1 * | 2/2008 | Maggio et al. | 434/362 |
| 2008/0133716 | A1 | 6/2008 | Rao et al. | |
| 2008/0140650 | A1 | 6/2008 | Stackpole | |
| 2008/0162649 | A1 * | 7/2008 | Lee et al. | 709/206 |
| 2008/0201442 | A1 * | 8/2008 | Ostermann et al. | 709/206 |

(Continued)

OTHER PUBLICATIONS

Eric Lieberman and Robert C. Miller, Showing Faces of Recipients to Prevent Misdirected Email, MIT Comp. Sci & Artificial Intelligence Lab, SOUPS 2007, p. 1-10.*

Eric Lieberman and Robert C. Miller, Showing Faces of Recipients to Prevent Misdirected Email, MIT Comp. Sci & Artificial Intelligence Lab, SOUPS 2007, p. 1-10, cols. 1-20.*

(Continued)

*Primary Examiner* — Larry Donaghue
*Assistant Examiner* — Aftab Nasir Khan
(74) *Attorney, Agent, or Firm* — Withrow & Terranova, PLLC

(57) ABSTRACT

Systems and methods are provided for generating, sending, and delivering a message addressed using an image of an intended message recipient of the message. In one embodiment, a sending user captures or otherwise obtains an image of an intended message recipient. A message to the intended message recipient is then generated, addressed using the image of the intended message recipient, and sent to a central server. The central server identifies the intended message recipient based on the image of the intended message recipient and optionally a location and time at which the image was captured. Optionally, the identity of the intended message recipient may be verified by one or more users such as one or more friends of the intended message recipient. The central server then sends the message to the intended message recipient using known contact information such as a username or email address of the intended message recipient.

22 Claims, 16 Drawing Sheets

U.S. PATENT DOCUMENTS

| | | |
|---|---|---|
| 2008/0263040 A1 | 10/2008 | Talreja |
| 2008/0307040 A1 | 12/2008 | So |
| 2009/0063995 A1* | 3/2009 | Baron et al. .................. 715/753 |
| 2009/0143079 A1* | 6/2009 | Klassen et al. ............. 455/456.3 |
| 2009/0170532 A1* | 7/2009 | Lee et al. .................. 455/456.3 |
| 2009/0175499 A1* | 7/2009 | Rosenblatt .................... 382/103 |
| 2009/0175509 A1* | 7/2009 | Gonion et al. ................ 382/118 |
| 2009/0271212 A1 | 10/2009 | Savjani et al. |
| 2010/0150410 A1 | 6/2010 | Shah et al. |

OTHER PUBLICATIONS

Kashmir Hill, "Welcome to the Not-So Private Parts where technology & privacy collide—Google Patents a celebrity facial recognition database" Forbes, May 19, 2011.*

Wing W. Y. NG, Tian-Ming Zheng et al. "Social Relationship Discovery and Face annotation in personal photo Collection", IEEE, ISBN: 978-1-4577-0308-9/11, pp. 631-637.*

* cited by examiner

FIG. 8A
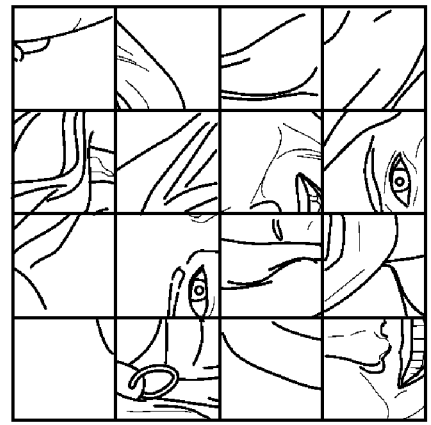
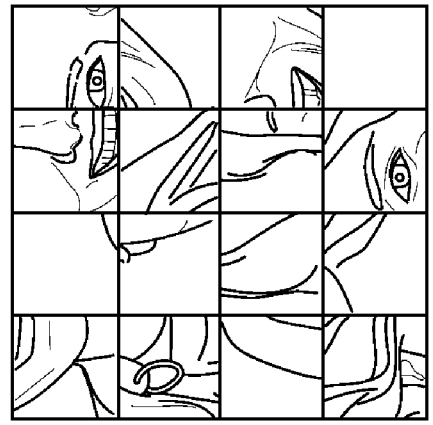
FIG. 8B

BLUR

GLASS

CARTOON

TWIRL

CRYSTALLIZE

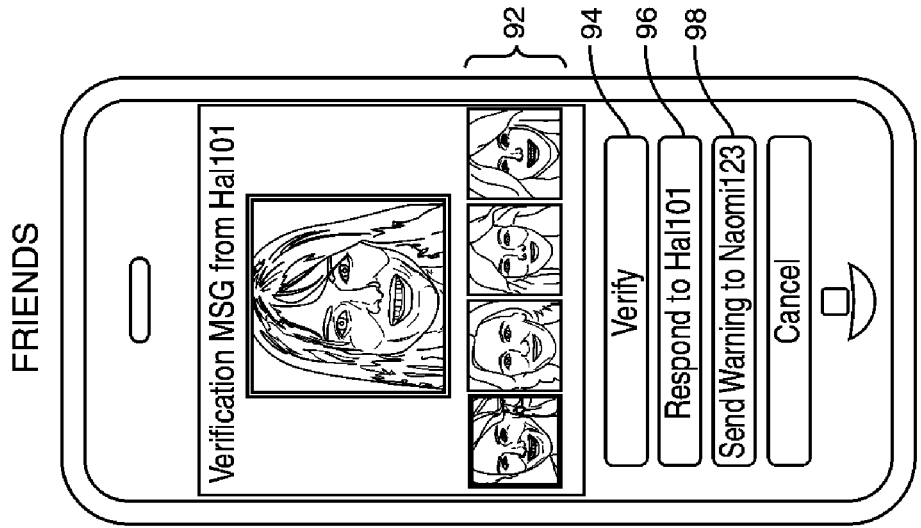
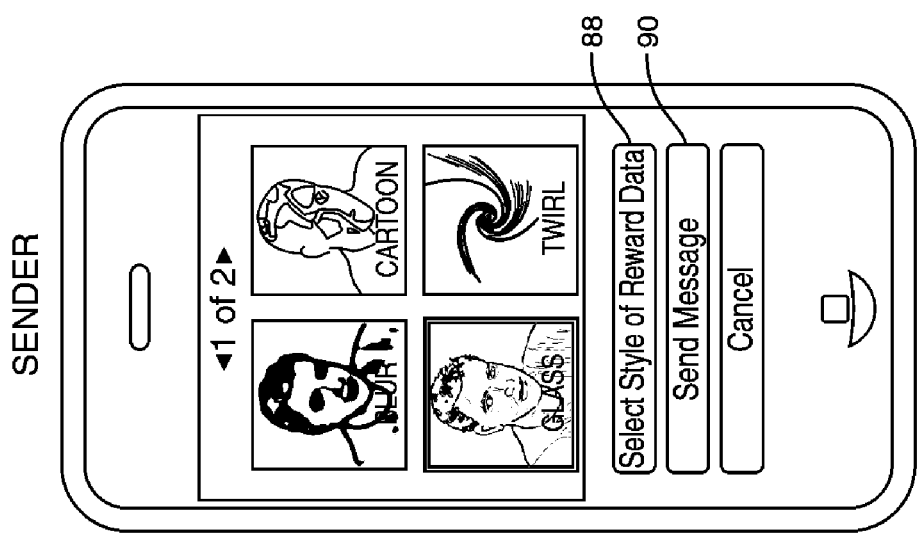
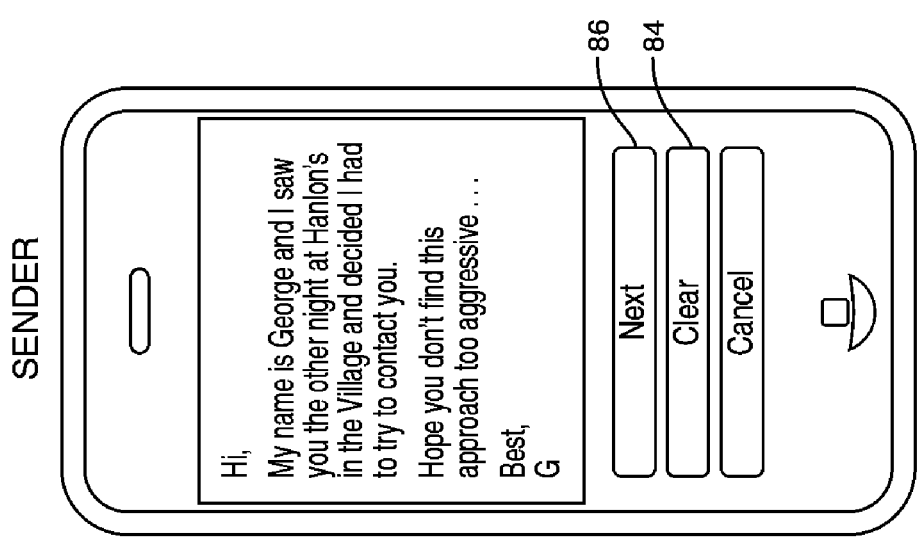
FIG. 14F
FIG. 14E
FIG. 14D

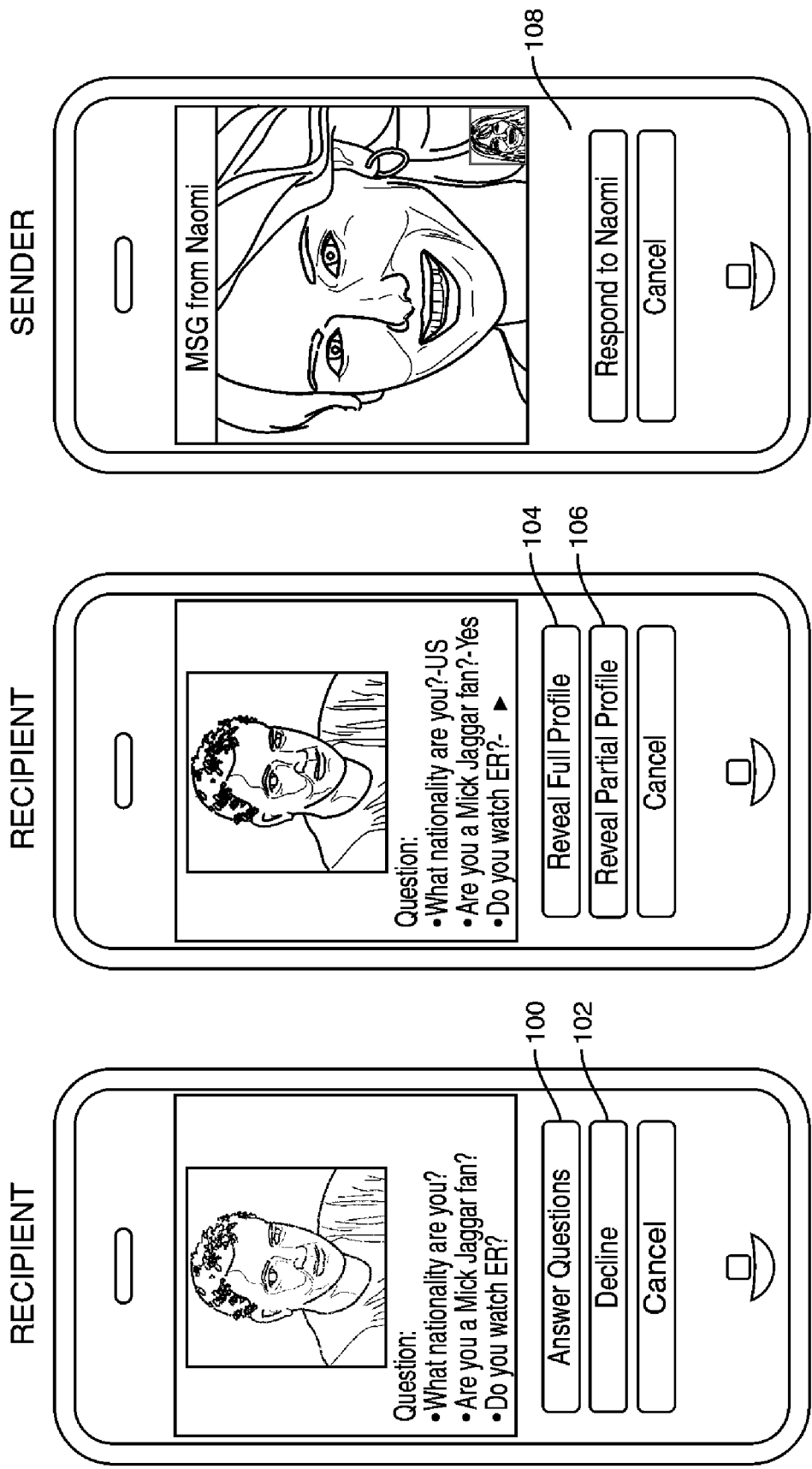

| Question Body | Answer Suggestion Scheme | Point Value | Keywords |
|---|---|---|---|
| What is your Favorite Band? | Calculated at Server | 5 | MEDIA |
| What is the last song you bought? | Calculated at Server | 5 | MEDIA |
| What is the last album you bought? | Calculated at Server | 5 | MEDIA |
| What was the last concert you attended? | Calculated at Server | 5 | MEDIA |
| What was the first concert you attended? | Calculated at Server | 5 | MEDIA |
| What is the last book you read? | Recipient Types In first time - then pulled from server | 10 | MEDIA |
| What is your favorite Movie? | Calculated at Server | 5 | MEDIA |
| Who is your favorite Actor? | Calculated at Server | 5 | MEDIA |
| What School Do you attend? | Pulled From Profile | 5 | SCHOOL, SPORTS |
| What is your favorite Sport? | Recipient Types In first time - then pulled from server | 5 | SPORTS |
| Who is going to win the next Super Bowl? | Multiple Choice | 5 | SPORTS |
| What is your Major? | Recipient Types In first time - then pulled from server | 10 | SCHOOL |
| What is your political affiliation? | Recipient Types In first time - then pulled from server | 10 | POLITICS |
| Who did you vote for in last presidential election? | Multiple Choice | 10 | POLITICS |
| Do you come here often? | Calculated at Server | 10 | DATING |
| How old are you? | Pulled From Profile | 20 | DATING |
| What is your telephone number? | Pulled From Profile | 20 | DATING |
| Do you live near here? | Calculated at Server | 30 | DATING |
| Married / Single? | Pulled From Profile | 30 | DATING |

*FIG. 18*

FACEMAIL

FIELD OF THE INVENTION

The present invention relates to generation and delivery of a message addressed using an image of the intended message recipient.

BACKGROUND OF THE INVENTION

Oftentimes a person finds himself in a situation where he would like to communicate with someone that he has encountered but he does not have access to the necessary contact information for that person. As such, there is a need for a system and method of enabling a first person to contact a second person for whom the first person does not have contact information.

SUMMARY OF THE INVENTION

The present invention relates to generating, sending, and delivering a message addressed using an image of an intended message recipient of the message. In one embodiment, a sending user captures or otherwise obtains an image of an intended message recipient. A message to the intended message recipient is then generated, addressed using the image of the intended message recipient, and sent to a central server. The central server then identifies the intended message recipient based on the image of the intended message recipient and optionally a location and time at which the image was captured. Optionally, the identity of the intended message recipient may be verified by one or more users such as, for example, one or more friends of the intended message recipient. The central server then sends the message to the intended message recipient using known contact information such as, for example, a username or email address of the intended message recipient. Upon receipt of the message, the intended message recipient may choose to reveal his or her full or partial user profile to the sending user, if desired. In addition or alternatively, the intended message recipient may respond to the message from the sending user.

In addition, the sending user may provide a reward to be revealed to the intended message recipient upon answering one or more questions. More specifically, in one embodiment, when generating the message, the sending user may also select a reward, which may be an image of the sending user, a full or partial profile of the sending user, or the like. The sending user may also select one or more questions to ask the intended message recipient. Then, the reward and the one or more questions are provided to the intended message recipient as part of the message or, alternatively, in conjunction with the message. Upon answering the one or more questions, the reward may be revealed to the intended message recipient. For example, the reward may be an image of the sending user. At first, the image is scrambled or otherwise distorted. As the intended message recipient answers the one or more questions in a manner desired by the sending user, the image of the sending user may become less and less distorted until, finally, the image is no longer distorted.

In another embodiment, the central server may select or recommend questions for the sending user to ask the intended message recipient. More specifically, a number of questions are stored at the server. Each of the questions is associated with one or more keywords. The central server then correlates interests of the sending user and interests of the intended message recipient to identify one or more keywords corresponding to common interests of the two users. Then, the central server selects one or more questions associated with the identified keywords. Optionally, the selected questions may then be sent to the sending user for approval, modification, editing, or the like. The selected questions may then be inserted into the message or provided in conjunction with the message when the message is sent to the intended message recipient. As discussed above, in one embodiment, as the intended message recipient answers the questions, a reward such as an image of the sending user or a full or partial profile of the sending user may be revealed to the intended message recipient. Similarly, the central server may suggest answers to the questions sent to the intended message recipient based on a previous answer given by the intended message recipient in response to the same question from the sending user or another user, information stored in a profile of the intended message recipient, historical information stored with respect to the intended message recipient, or the like.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIGS. 8A and 8B illustrate exemplary reward states for a reward revealed to an intended message recipient in response to the intended message recipient answering questions according to one embodiment of the present invention;

Figure 1:
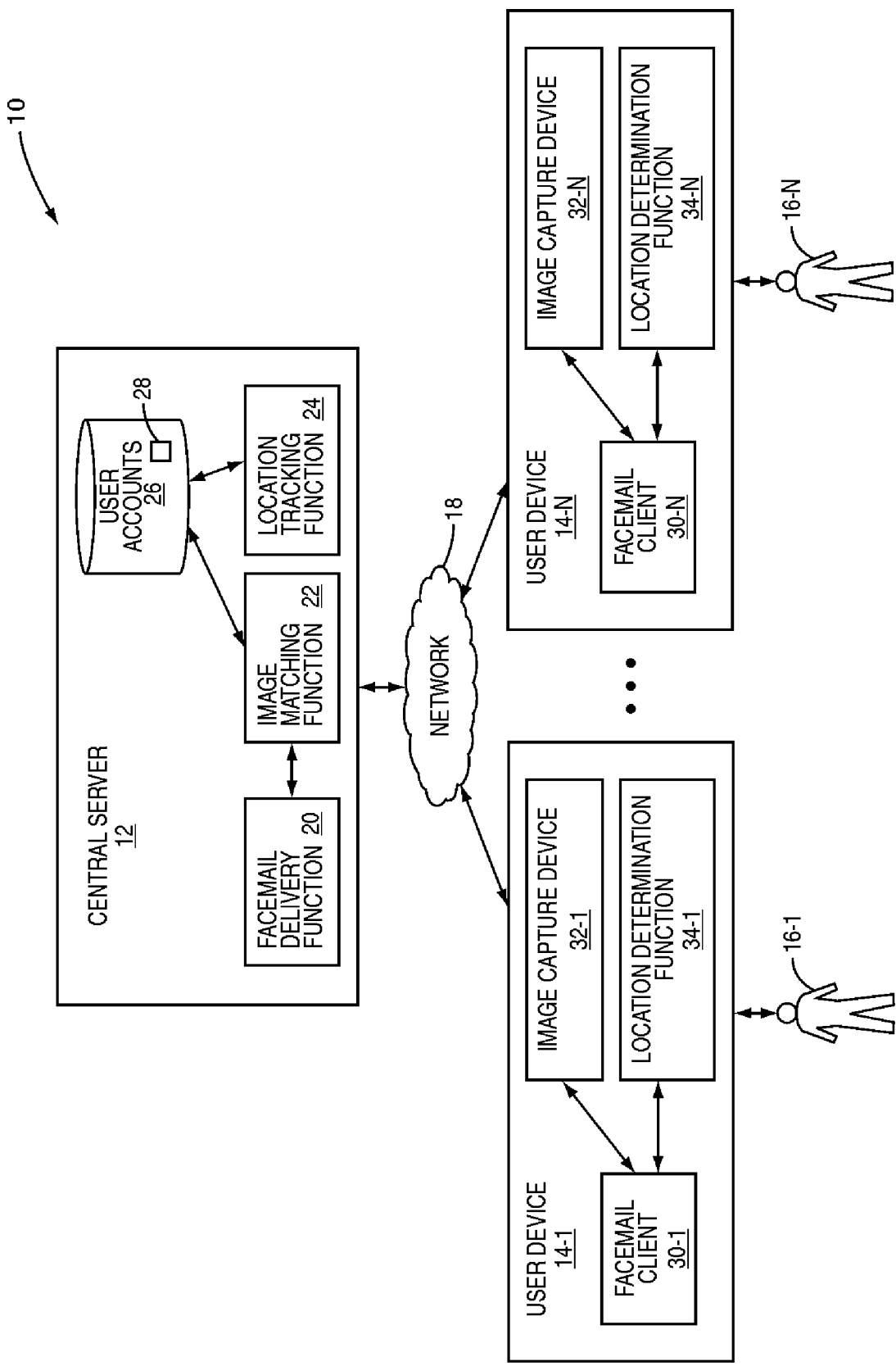
FIG. 1 illustrates a system for delivering a message based on an image of an intended message recipient according to one embodiment of the present invention.
Figure 4:
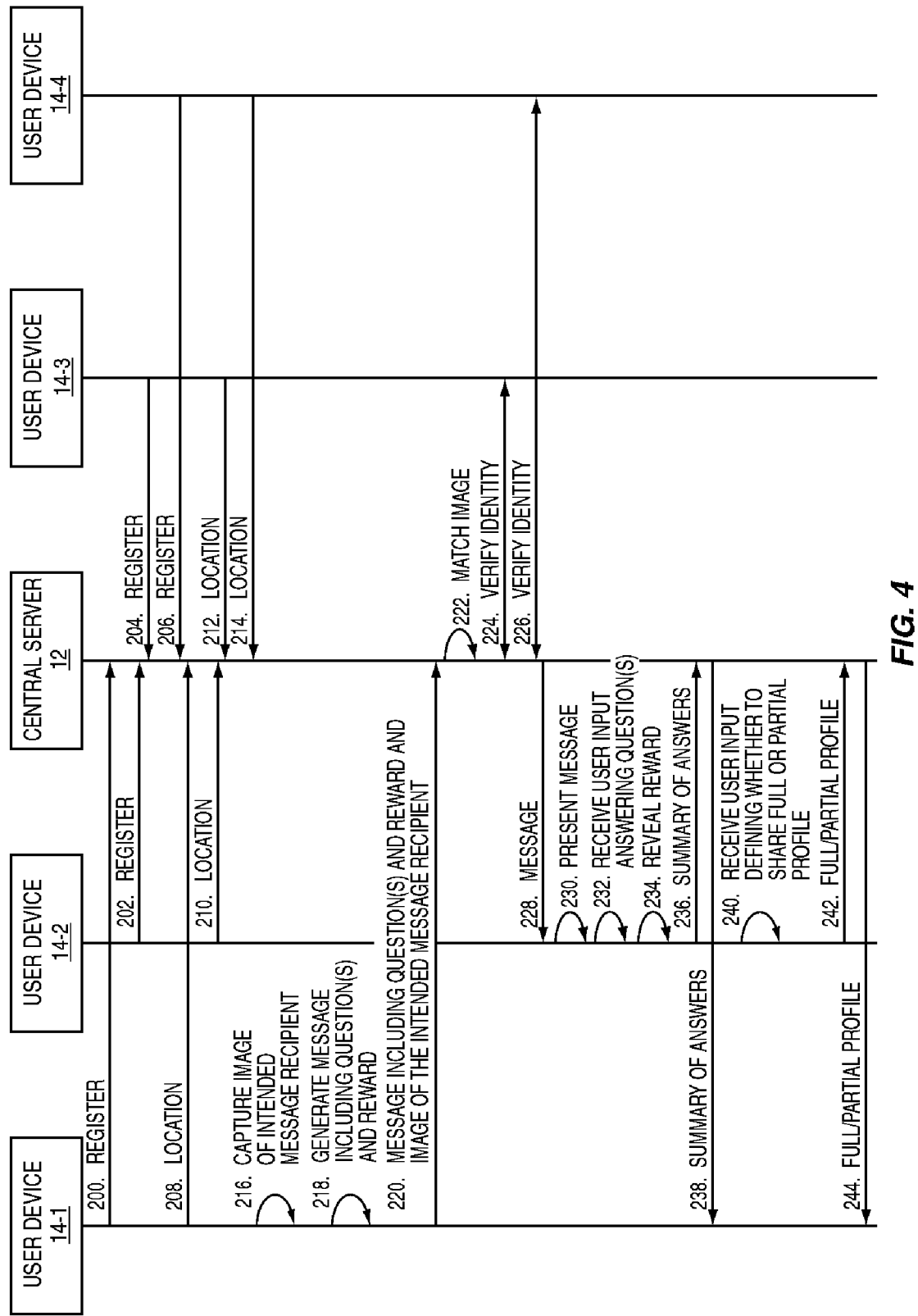
FIG. 4 illustrates the operation of the system of FIG. 1 according to another embodiment of the present invention.
Figure 15:
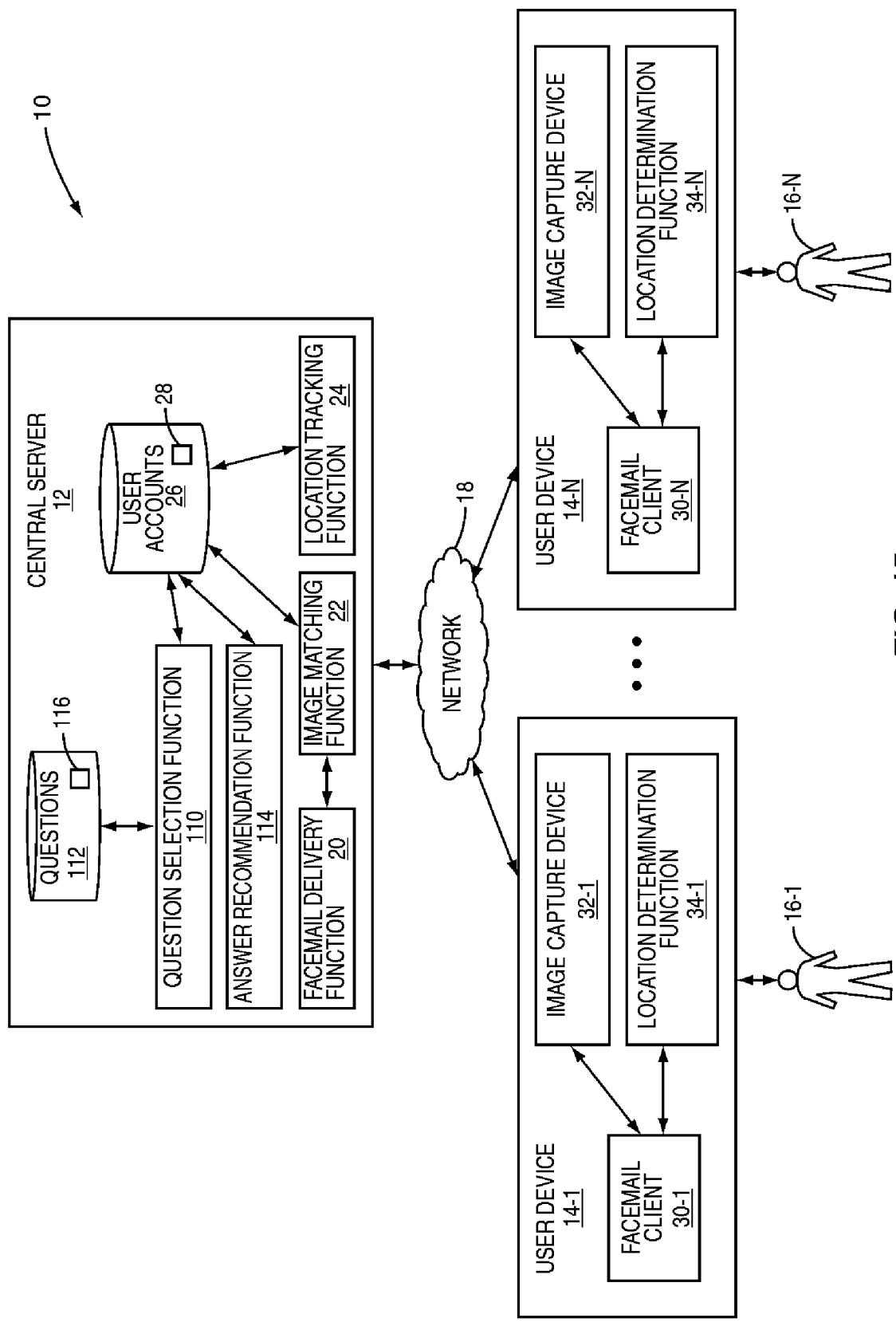
Figure 16:
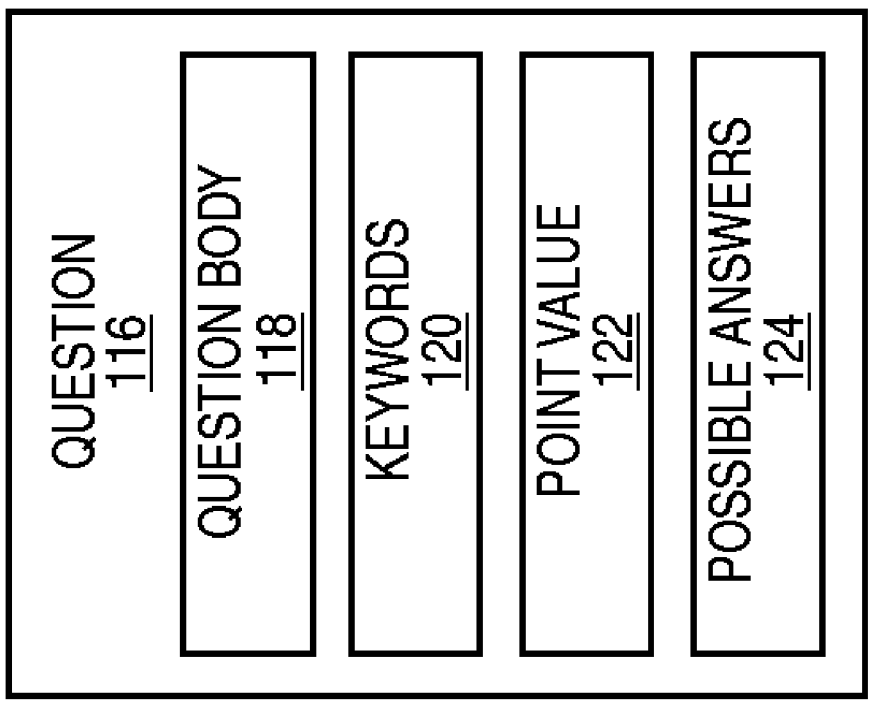
Figure 17A:
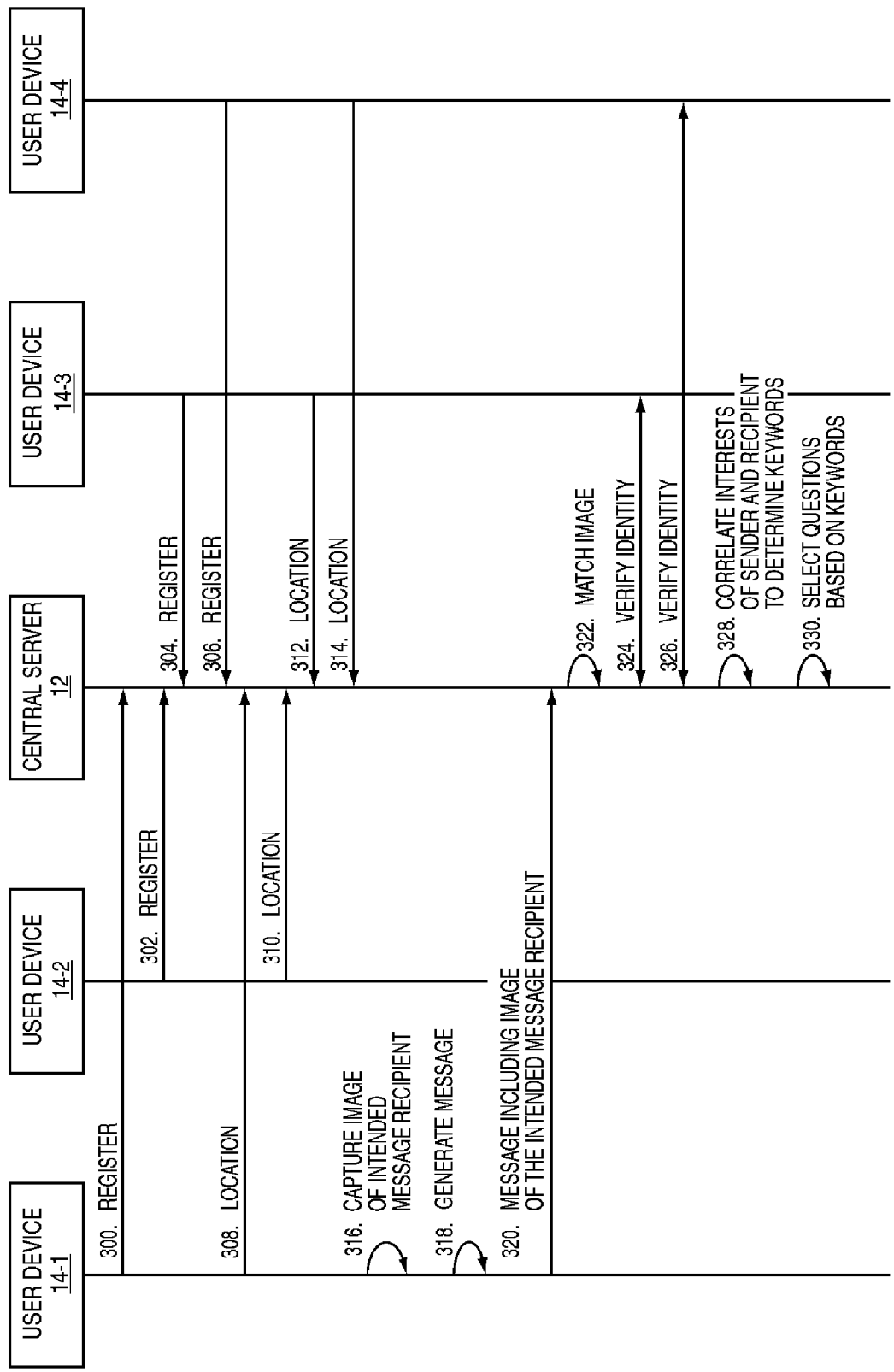
Figure 17B:
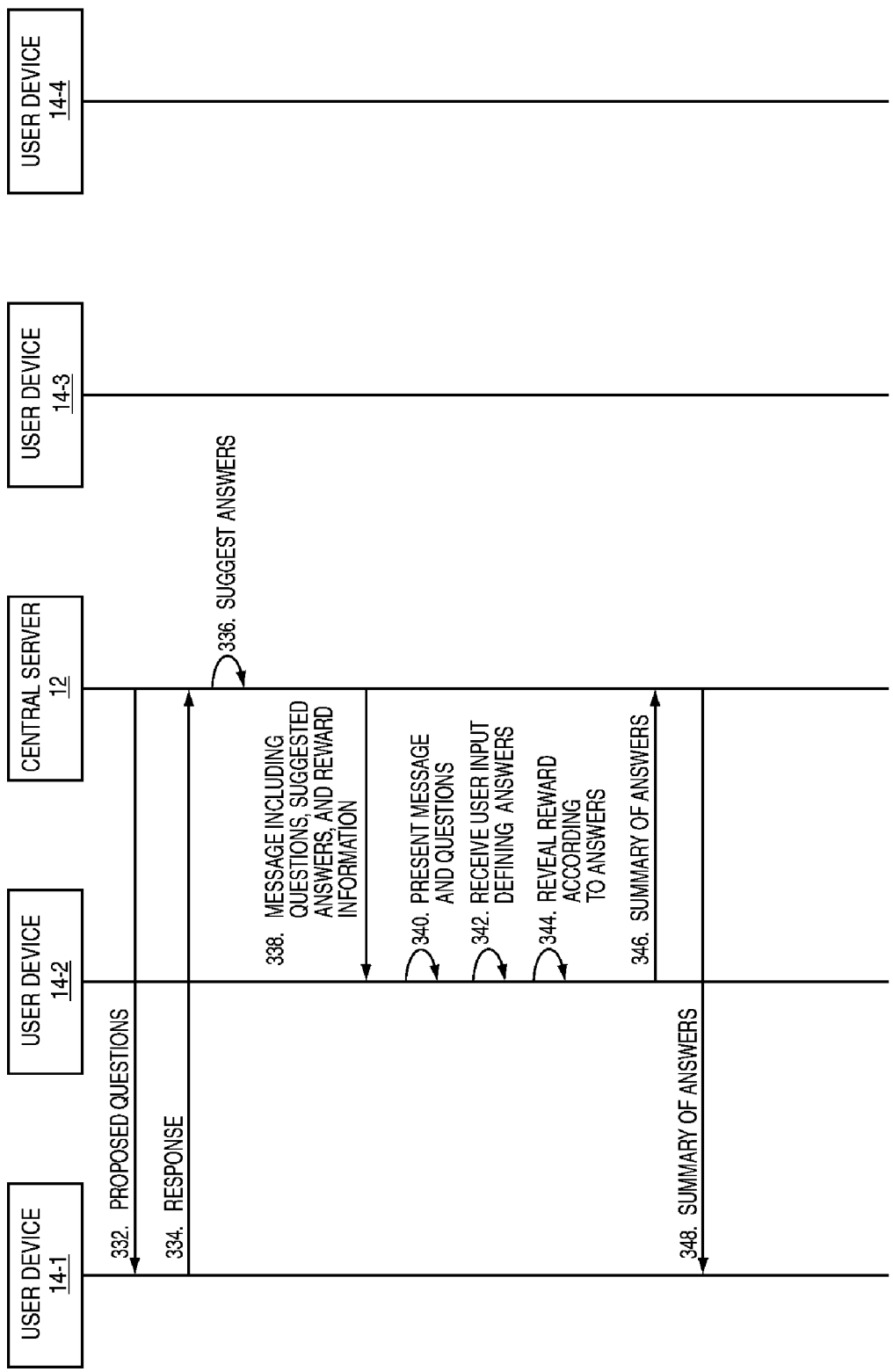
Figure 20:
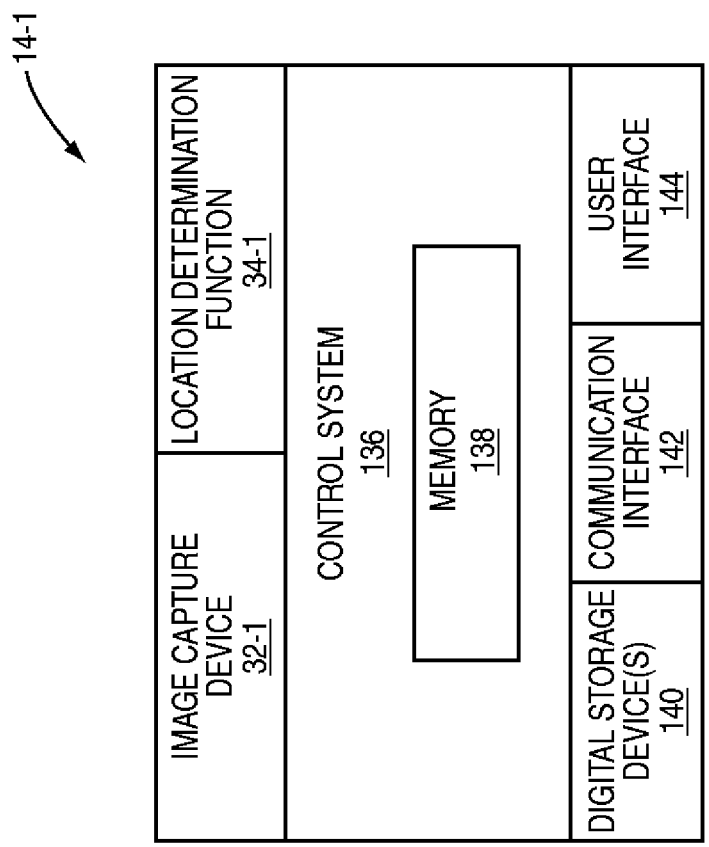
Figure 19:
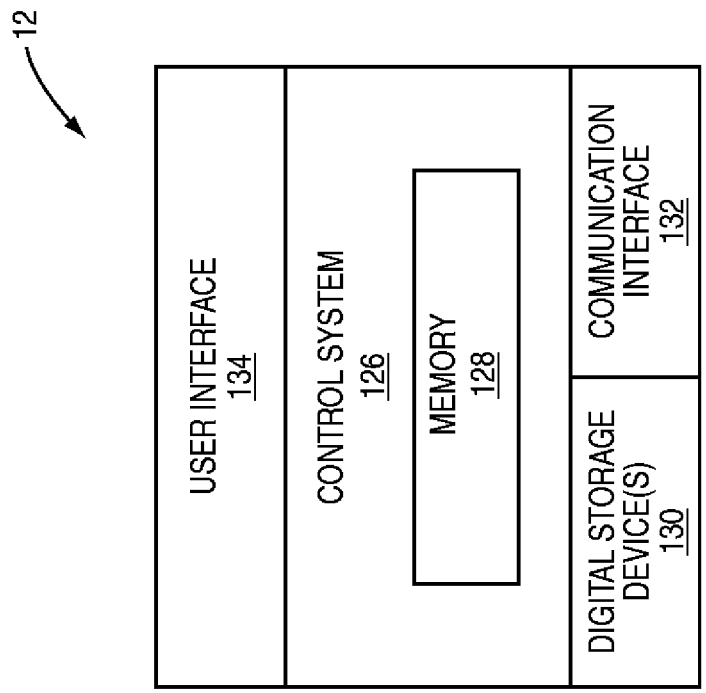

FIGS. 14A-14I graphically illustrate the process of FIG. 4 according to an exemplary embodiment of the present invention;

FIG. 15 illustrates a system for delivering a message based on an image of an intended message recipient according to another embodiment of the present invention;

FIG. 16 illustrates an exemplary question according to the embodiment of the system illustrated in FIG. 15;

FIGS. 17A and 17B illustrate the operation of the system of FIG. 15 according to one embodiment of the present invention;

FIG. 18 provides a list of exemplary questions and corresponding schemes for suggesting answers to the questions according to one embodiment of the present invention;

FIG. 19 is a block diagram of the central server of FIGS. 1 and 15 according to one embodiment of the present invention; and FIG. 20 is a block diagram of one of the user devices of FIGS. 1 and 15 according to one embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

FIG. 1 illustrates an exemplary system 10 for generating messages, addressing the messages using images of intended message recipients of the messages, and delivering the messages to the intended message recipients based on the image according to one embodiment of the present invention. In general, the system 10 includes a central server 12 and a number of user devices 14-1 through 14-N having associated users 16-1 through 16-N. The central server 12 and the user devices 14-1 through 14-N are connected via a network 18. The network 18 may be any type of Wide Area Network (WAN), Local Area Network (LAN), or the like, or any combination thereof, and may include wired components, wireless components, or both wired and wireless components. Note that while the central server 12 is illustrated as a single server, the central server 12 may alternatively be implemented as multiple servers having the functionality of the central server 12 distributed thereon. As another alternative, all or a portion of the functionality of the central server 12 may be distributed among the user devices 14-1 through 14-N.

The central server 12 includes a facemail delivery function 20, an image matching function 22, a location tracking function 24, and a user accounts database 26. The facemail delivery function 20 may be implemented in software, hardware, or a combination thereof. In general, the facemail delivery function 20 operates to receive messages addressed with images of intended message recipients, provide the images of the intended message recipients to the image matching function 22 for identification of the intended message recipients, and deliver the messages to the intended message recipients.

The image matching function 22 may be implemented in software, hardware, or a combination thereof. In general, images of the users 16-1 through 16-N are stored in user accounts 28 of the users 16-1 through 16-N in the user accounts database 26, as discussed below. The image matching function 22 operates to match images of intended message recipients of messages received by the facemail delivery function 20 to the images of the users 16-1 through 16-N stored in the user accounts 28 to identify the intended message recipients of the messages. After identifying the intended message recipients, the contact information for the intended message recipients is provided to or otherwise obtained by the facemail delivery function 20 in order to deliver the messages to the intended message recipients. The contact information is generally any type of information enabling the facemail delivery function 20 to deliver the messages to the intended message recipients. For example, the contact information may be email addresses of the intended messages recipients, usernames of the intended message recipients such as those used by instant messaging applications, or the like.

The location tracking function 24 may be implemented in software, hardware, or a combination thereof. In general, the location tracking function 24 operates to obtain the locations of the users 16-1 through 16-N from the user devices 14-1 through 14-N. In one embodiment, the location tracking function 24 polls the user devices 14-1 through 14-N for their locations periodically or as otherwise desired. In another embodiment, the user devices 14-1 through 14-N periodically provide their locations to the location tracking function 24, provide their initial locations to the location tracking function 24 and thereafter send updates as their locations change, or the like. The locations of the users 16-1 through 16-N are stored in the user accounts 28 of the users 16-1 through 16-N in the user accounts database 26. In addition, as discussed below, the user accounts 28 of the users 16-1 through 16-N may include historical records of the locations of the users 16-1 through 16-N for at least a predetermined amount of time such as, for example, the last day, the last week, the last month, or the like.

The user accounts database 26 generally operates to store a user account 28 for each of the users 16-1 through 16-N registered with the system 10. Using the user 16-1 as an example, the user account 28 of the user 16-1 generally includes a user profile of the user 16-1 and an image, or picture, of the user 16-1. The user profile may include, for example, contact information for the user 16-1 such as an email address, instant messaging username, telephone number, or the like. In addition, the user profile may include demographic information such as sex, age, height, weight, or the like. In addition to the user profile and the image of the user 16-1, the user account 28 of the user 16-1 may include a current location of the user 16-1 and a historical record of the location of the user 16-1. Still further, for certain embodiments of the present invention, the user account 28 of the user 16-1 may include a friends list of the user 16-1, preferences of the user 16-1, and/or answers provided to previous questions asked of the user 16-1. The preferences may include an indication as to whether the user 16-1 desires to receive messages sent by users identifying the user 16-1 as the intended message recipient using an image of the user 16-1 or the like. As discussed below, in one embodiment, the answers provided to previous questions may be used to suggest answers to the same or similar questions received by the user 16-1 in the future.

The user devices 14-1 through 14-N are preferably mobile devices having image capture and networking capabilities. For example, the user devices 14-1 through 14-N may each be a mobile telephone equipped with an image capture device such as an Apple® iPhone. However, the present invention is not limited to mobile devices. The user devices 14-1 through 14-N may also be, for example, personal computers or the like. The user device 14-1 includes a facemail client 30-1, an image capture device 32-1, and a location determination function 34-1. Likewise, the user devices 14-2 through 14-N include facemail clients 30-2 through 30-N, image capture devices 32-2 through 32-N, and location determination functions 34-2 through 34-N, respectively.

The facemail client 30-1 may be implemented in software, hardware, or a combination thereof. In general, the facemail client 30-1 operates under the control of the user 16-1 to generate a message, address the messages using an image of an intended message recipient, and send the message including the image of the intended message recipient to the facemail delivery function 20. In addition, the facemail client 30-1 may enable the user 16-1 to crop an image to select an intended message recipient within an initial image such as an image of a group of persons. Still further, in some embodiments, the facemail client 30-1 may enable the user 16-1 to define questions to ask an intended message recipient and a reward to be revealed to the intended message recipient as the questions are answered by the intended message recipient.

The image capture device 32-1 preferably is or includes a digital camera capable of capturing digital images, where the digital camera includes a hardware component and potentially a software component. Note that while the image capture device 32-1 is illustrated herein as being part of the user device 14-1, the image capture device 32-1 may alternatively be an external device connected to the user device 14-1 via, for example, a wired connection such as a Universal Serial Bus (USB) or Firewire connection, a local wireless connection such as a Bluetooth® connection, or the like.

The location determination function 34-1 may be implemented in hardware, software, or a combination thereof. In general, the location determination function 34-1 is any hardware device and/or software application that is capable of determining a location of the user device 14-1, and thus the location of the user 16-1. In one embodiment, the location determination function 34-1 is a Global Positioning System (GPS) receiver or similar Satellite Positioning System (SPS) receiver. In another embodiment, the location determination function 34-1 operates to obtain a location of the user device 14-1 from a base station of a cellular telecommunications network. Note that these two exemplary embodiments of the location determination function 34-1 are not intended to limit the scope of the present invention. Also, while the location determination function 34-1 is illustrated as being part of the user device 14-1, the location determination function 34-1 may alternatively be an external device connected to the user device 14-1 via, for example, a wired connection such as a USB or Firewire connection, a local wireless connection such as a Bluetooth® connection, or the like. Still further, the image capture device 32-1 and the location determination function 34-1 may alternatively be implemented as a GPS-enabled digital camera that is connected to the user device 14-1 via, for example, a wired connection such as a USB or Firewire connection, a local wireless connection such as a Bluetooth® connection, or the like.

Figure 2:
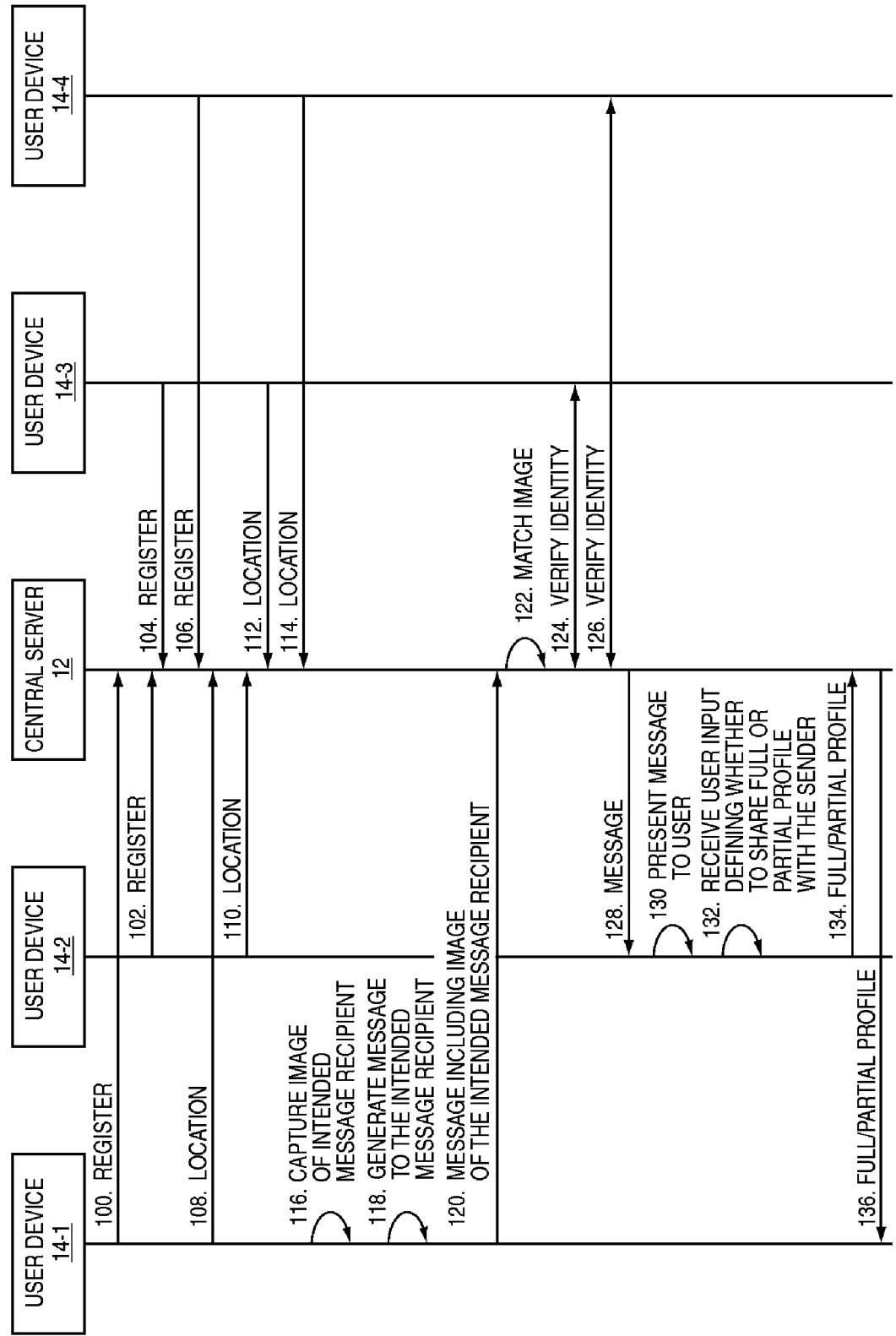
FIG. 2 illustrates the operation of the system of FIG. 1 according to one embodiment of the present invention.

FIG. 2 illustrates the operation of the system 10 of FIG. 1 according to one embodiment of the present invention. First, the user devices 14-1 through 14-4, or alternatively the users 16-1 through 16-4, register with the central server 12 (steps 100-106). During registration, the user accounts 28 of the users 16-1 through 16-4 are created. Again, the user accounts 28 of the users 16-1 through 16-4 include the user profiles and images of the users 16-1 through 16-4, respectively. In addition, the user accounts 28 of the users 16-1 through 16-4 may include friends lists and preferences of the users 16-1 through 16-4, respectively. Using the user 16-1 as an example, the friends list of the user 16-1 may identify one of more of the other users 16-2 through 16-N as friends of the user 16-1. The friends list of the user 16-1 may be defined by the user 16-1 during registration, exported or otherwise obtained from a software application maintaining a list of contacts of the user 16-1 such as, for example, an email application or an instant messaging application, or exported or otherwise obtained from a contact list maintained by the user device 14-1 where, for example, the user device 14-1 is a mobile telephone. In addition or alternatively, the friends list of the user 16-1 may be populated by querying a social networking service such as, for example, MySpace or Facebook for other users that are related to the user 16-1 within a defined number of one or more degrees of separation.

Still further, a more complex scheme may be used to identify the other users in the friends list of the user 16-1. More specifically, a scheme may be used to identify other users from the users 16-2 through 16-N that may be friends of the user 16-1, a confidence level may be assigned to each of the identified users, and, optionally, the user 16-1 may be given some level of control over which of the identified users are included in the friends list of the user 16-1. For example, the central server 12 may process images including the user 16-1 and one or more other users and determine that the one or more other users are friends of the user 16-1 since the user 16-1 and the other users appear in the same image or frequently appear in the same images. These images may be images provided to the central server 12 as part of the message generation and delivery process discussed herein, retrieved from a social networking service such as a social networking website, retrieved from a photo sharing service such as a photo sharing website, or the like. Also, the central server 12 may determine that if, for example, the user 16-1 is closer to one user than another user in a particular image, that the user 16-1 is more likely to be friends with the user being closer to the user 16-1 in the image.

As another example, the central server 12 may identify the friends of the user 16-1 by identifying other users nearby the user 16-1 when an image of the user 16-1 is captured and used to address a message as discussed herein. The profiles of the other users nearby the user 16-1 at the time the image was captured may be used in addition to other information such as information obtained from a social networking service in order to identify the friends of the user 16-1.

Next, the user devices 14-1 through 14-4 provide their locations, or location information, to the central server 12 (steps 108-114). Using the user device 14-1 as an example, in one embodiment, the facemail client 30-1 (FIG. 1) obtains a location of the user device 14-1 from the location determination function 34-1 and sends the location of the user device 14-1 to the location tracking function 24 of the central server 12. The location may be, for example, GPS coordinates, a street address, or the like. As discussed above, the user devices 14-1 through 14-4 may send their locations to the central server 12 automatically. For example, the user device 14-1 may send an initial location to the central device 12 during registration and thereafter provide periodic updates to the central server 12 or provide updates to the central server 12 as the location of the user device 14-1 changes. As an alternative, the central server 12 may poll the user devices 14-1 through 14-4 for their locations periodically or as otherwise desired. The locations of the user devices 14-1 through 14-4 are stored in the user accounts 28 of the corresponding users 16-1 through 16-4. As discussed above, the current locations of the user devices 14-1 through 14-4 may be stored as the current locations of the users 16-1 through 16-4. In addition, historical records of the locations of the users 16-1 through 16-4 may be stored in the corresponding user accounts 28.

At this point, in this example, the user device 14-1, and more specifically the image capture device 32-1, captures an image of an intended message recipient (step 116). Note that, at the time of capturing the image, the user 16-1 may or may not have the present intent to send a message to the intended message recipient. However, the term "intended message recipient" is used as a means for referring to an individual to whom the user 16-1 subsequently generates and sends a message. In an alternative embodiment, the image of the intended message recipient may be obtained from a secondary source. The secondary source may be, for example, a photo sharing website or application, a website, an email attachment of an email from a friend, or the like. In one embodiment, when obtaining the image of the intended message recipient from a secondary source, a location and time of capturing the image are provided in association with the image. For example, the location and time of capturing the image may be provided as metadata (e.g., ID3 tags) associated with the image.

Next, a message to the intended message recipient is generated (step 118). More specifically, the user 16-1 may initiate the generation of the message to the intended message recipient and specify a payload for the message. The payload of the message is preferably a text message. However, the present invention is not limited thereto. In addition, the user 16-1 addresses the message using the image of the intended message recipient. In one embodiment, image matching is performed based on a portrait of the intended message recipient and portraits of the users 16-1 through 16-N stored in the user accounts 28 of the users 16-1 through 16-N. As such, if the image of the intended message recipient is, for example, a full body shot, cropping or similar processing may be used to select a portrait of the intended message recipient. As used herein, a portrait of a person is an image or picture especially of the head and shoulders of the person. Cropping or similar processing may also be desired where the image of the intended message recipient is to be created or selected from an image including a group of persons.

It should be noted that the exemplary embodiments discussed herein focus on generating and sending a message to a single intended message recipient. However, the message may be addressed to any number of intended message recipients using only or essentially images of the intended message recipients. For example, if a message is to be sent to two intended message recipients, images for those two intended message recipients are obtained and used to address the message.

The user device 14-1, and more specifically the facemail client 30-1, then sends the message including the image of the intended message recipient to the central server 12 (step 120). Note that preferably, other than the image of the intended message recipient, no other contact information (e.g., email address, username, telephone number, etc.) of the intended message recipient is known by the user 16-1. The message is addressed to the intended message recipient using only or essentially the image of the intended message recipient. The message is not addressed using text or numbers as in traditional messaging systems. Also note that the location and time at which the image of the intended message recipient was captured may also be provided as part of the message or, alternatively, in association with the image of the intended message recipient such as in ID3 tags of the corresponding image file.

Upon receiving the message from the user device 14-1, the central server 12 performs an image matching process to identify the intended message recipient (step 122). More specifically, the facemail delivery function 20 of the central server 12 provides the image of the intended message recipient to the image matching function 22. Then, in one embodiment, the image matching function 22 uses known image matching techniques to match the image of the intended message recipient to the image stored in the user account 28 of one of the users 16-2 through 16-N. In this example, the image matching results in identifying the user 16-2 as the intended message recipient. The image matching function 22 may compare the location and time at which the image of the intended message recipient was captured to the historical location information for the user 16-2 to verify that the user 16-2 was at the location where the image of the intended message recipient was captured at the time the image of the intended message recipient was captured. In another embodiment, the image matching function 22 may first identify a subset of the users 16-2 through 16-N that were at or near the location where the image of the intended message recipient was captured at the time that the image of the intended message recipient was captured. Then, the image matching function 22 uses known image matching techniques to match the image of the intended message recipient to the image stored in the user account 28 of one of the subset of the users 16-2 through 16-N that were at or near the location where the image of the intended message recipient was captured at the time that it was captured.

Once the user 16-2 is identified as the intended message recipient, the facemail delivery function 20 of the central server 12 may interact with friends of the user 16-2 to verify that the user 16-2 is the intended message recipient (steps 124 and 126). In this example, the users 16-3 and 16-4 of the user devices 14-3 and 14-4, respectively, are identified in the friends list of the user 16-2. In one embodiment, verification is performed by sending, to the friends of the user 16-2, the image of the intended message recipient and a line-up including the image of the user 16-2 from the user account 28 of the user 16-2 as well as images of one or more additional users from the users 16-3 through 16-N most closely matching the image of the intended message recipient. The friends of the user 16-2, which in this example are the users 16-3 and 16-4, then select the image from the line-up that matches the image of the intended message recipient. If the user 16-2 is verified as the intended message recipient, the process continues. Otherwise, the central system 12 may return an error message to the user 16-1 at the user device 14-1. Alternatively, if the friends of the user 16-2 select another user from the line-up as matching the image of the intended message recipient, the central server 12 may identify that user as the intended message recipient. Note that the central server 12 may periodically or on occasion send out test verification messages to the friends of the users 16-1 through 16-N in order to ensure that the friends are providing appropriate feedback. Preferably, the test messages would appear to the friends as if the messages were real verification messages.

Assuming that the user 16-2 is verified as the intended message recipient, the facemail delivery function 20 of the central server 12 then sends the message to the user device 14-2 of the user 16-2 (step 128). More specifically, once the user 16-2 is identified as the intended message recipient, the central server 12 may obtain contact information for the user 16-2 from the user account 28 of the user 16-2. The contact information may be, for example, an email address of the user 16-2, an instant messaging username of the user 16-2, a telephone number to be used for text messaging, contact information such as a username used specifically for delivering messages in the system 10, or the like. Using the contact information of the user 16-2, the facemail delivery function 20 then sends the message to the user 16-2 at the user device 14-2. Note that the central server 12 may alternatively deliver the message to the user 16-2 at the user device 14-2 using a web interface. For example, the user 16-2 may log into the web interface in a manner similar to current web-based email interfaces such as Yahoo!® Mail. Once the user 16-2 is logged in, the message may be presented to the user 16-2 at the user device 14-2 via the web interface.

Once the message is received at the user device 14-2, the facemail client 30-2 presents the message to the user 16-2 at the user device 14-2 (step 130). The message may be presented automatically or upon request by the user 16-2. The user profile, including the contact information, of the user 16-1 may or may not be available to the user 16-2 at this time. At this point, the facemail client 30-2 may receive user input from the user 16-2 defining whether the full profile of the user 16-2 or a partial profile of the user 16-2, if any, is to be sent to the user 16-1 (step 132). In one embodiment, the partial user profile is a select subset of the user profile of the user 16-2 in the user account 28 of the user 16-2 and may be system-defined, defined by the user 16-2, or selected by the user 16-2 in response to receiving the message. If the user 16-2 chooses to reveal his or her full or partial user profile to the user 16-1, the facemail client 30-2 sends the full or partial profile to the central server 12 for delivery to the user 16-1 at the user device 14-1 or instructs the central server 12 to provide the full or partial user profile of the user 16-2 to the user 16-1 at the user device 14-1 (step 134). The full or partial user profile of the user 16-2 is then sent to the user device 14-1 of the user 16-1, and presented to the user 16-1 (step 136). While not shown, at this point, the user 16-1 may choose to reveal his or her full or partial user profile to the user 16-2 if this information was not previously provided to the user 16-2 in the message or in association with the message.

Note that the user 16-2 may choose to respond to the message in addition to or as an alternative to revealing his or her full or partial profile to the user 16-1. If the message delivered in step 128 includes the contact information of the user 16-1 or if the contact information is provided in association with the message in step 128, any message sent from the user 16-2 to the user 16-1 in response to the message delivered in step 128 may be provided directly from the user device 14-2 to the user device 14-1 of the user 16-1 using the appropriate communication system. For example, if the contact information provided for the user 16-1 is the email address of the user 16-1, the response message may be provided by the appropriate email system. However, if the contact information of the user 16-1 is not included in the message or is not provided in association with the message, any message sent from the user 16-2 to the user 16-1 in response to the message delivered in step 128 may first be provided to the central server 12. The central server 12 may then deliver the response message to the user device 14-1 of the user 16-1.

Figure 3:
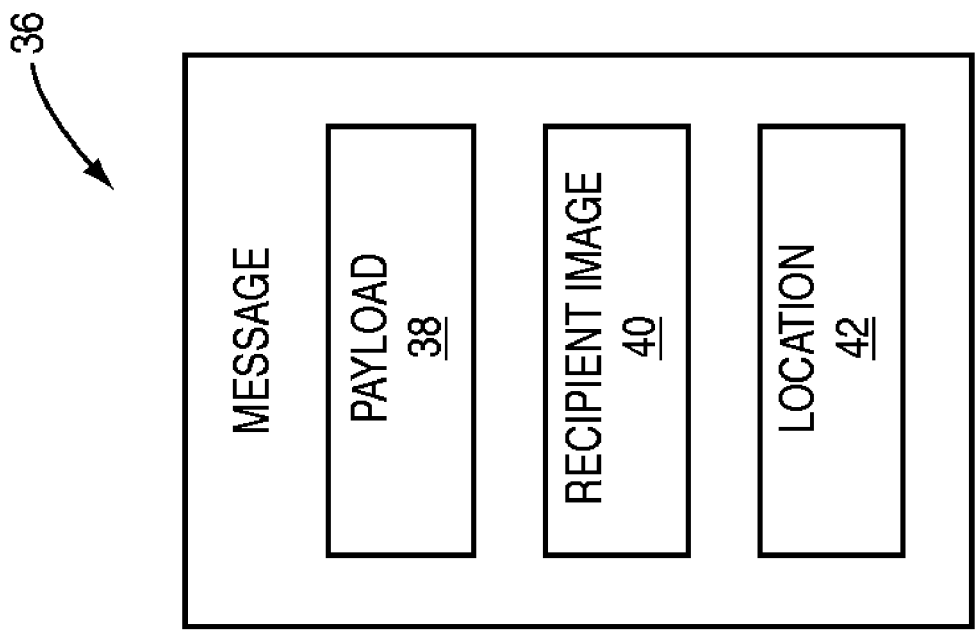
FIG. 3 illustrates an exemplary embodiment of the message sent in FIG. 2.

FIG. 3 illustrates an exemplary message 36 generated by the facemail client 30-1 and sent to the central server 12 for delivery to the intended message recipient according to one embodiment of the present invention. In this embodiment, the message 36 includes a payload 38. As discussed above, the payload is preferably a text message provided by the user 16-1. However, the payload 38 is not limited thereto. For example, the payload 38 may additionally or alternatively include a video message created by the user 16-1, a video clip selected by the user 16-1, a picture of the user 16-1, a picture selected by the user 16-1, or the like. The message 36 also includes a recipient image 40, which is an image of the intended recipient, and a location 42 at which the recipient image 40 was captured. Note that, preferably, a time at which the image was captured is stored as metadata in association with the recipient image 40. For example, the time at which the recipient image 40 was captured may be stored as a tag within the corresponding image file.

FIG. 4 illustrates the operation of the system 10 of FIG. 1 according to another embodiment of the present invention. This embodiment is substantially the same as that shown in FIG. 2. However, a question and reward scheme is used to reveal a reward to the intended message recipient in response to the intended message recipient answering a number of questions. First, the user devices 14-1 through 14-4, or alternatively the users 16-1 through 16-4, register with the central server 12 (steps 200-206). As discussed above, during registration, the user accounts 28 of the users 16-1 through 16-4 are created. Next, the user devices 14-1 through 14-4 provide their locations, or location information, to the central server 12 (steps 208-214). Again, the user devices 14-1 through 14-4 may send their locations to the central server 12 automatically. As an alternative, the central server 12 may poll the user devices 14-1 through 14-4 for their locations periodically or as otherwise desired. The locations of the user devices 14-1 through 14-4 are stored in the user accounts 28 of the corresponding users 16-1 through 16-4. The current locations of the user devices 14-1 through 14-4 may be stored as the current locations of the users 16-1 through 16-4. In addition, historical records of the locations of the users 16-1 through 16-4 may be stored in the corresponding user accounts 28. At this point, in this example, the user device 14-1, and more specifically the image capture device 32-1, captures an image of an intended message recipient (step 216). As discussed above, in an alternative embodiment, the image of the intended message recipient may be obtained from an alternative source such as, for example, a photo sharing website or application, a website, an email attachment of an email from a friend, or the like.

Next, a message to the intended message recipient is generated (step 218). More specifically, the user 16-1 may initiate the generation of the message to the intended message recipient and specify a payload for the message. The payload of the message is preferably a text message. However, the present invention is not limited thereto. In addition, the user 16-1 addresses the message using the image of the intended message recipient. As discussed above, in one embodiment, cropping or similar processing may be utilized to provide the image of the intended message recipient as a portrait of the intended message recipient.

In addition, in this embodiment, the user 16-1 defines a number of questions to ask the intended message recipient as well as a reward to be revealed to the intended message recipient upon answering the questions. More specifically, the user 16-1 may create the questions, select the questions from a predefined group of questions created by the user 16-1, select the questions from a group of system-defined questions, or the like. In one embodiment, each question includes the question body or text, a point value assigned to the question by the user 16-1, and possible answers to the question if the question is a multiple choice question. As discussed below, the point values assigned to the questions may be used to control revealing of the reward. The reward may be, for example, a picture of the user 16-1 sending the message, a full or partial profile of the user 16-1 sending the message, contact information for the user 16-1 sending the message, or the like.

The user device 14-1, and more specifically the facemail client 30-1, then sends the message including the image of the intended message recipient, the questions, and the reward information to the central server 12 (step 220). Note that preferably, other than the image of the intended message recipient, no other contact information (e.g., email address, username, telephone number, etc.) of the intended message recipient is known by the user 16-1. The message is addressed to the intended message recipient using only or essentially the image of the intended message recipient. Also note that the location and time at which the image of the intended message recipient was captured may also be provided as part of the message or, alternatively, in association with the image of the intended message recipient such as in ID3 tags of the corresponding image file.

As discussed above, upon receiving the message from the user device 14-1, the central server 12 performs an image matching process to identify the intended message recipient (step 222). In this example, the user 16-2 again is identified as the intended message recipient. Once the user 16-2 is identified as the intended message recipient, the facemail delivery function 20 of the central server 12 may interact with friends of the user 16-2 to verify that the user 16-2 is the intended message recipient (steps 224 and 226). In this example, the users 16-3 and 16-4 of the user devices 14-3 and 14-4, respectively, are identified in the friends list of the user 16-2. Assuming that the user 16-2 is verified as the intended message recipient, the facemail delivery function 20 of the central server 12 then sends the message to the user device 14-2 of the user 16-2 (step 228).

Once the message is received at the user device 14-2, the facemail client 30-2 presents the message to the user 16-2 at the user device 14-2 (step 230). The message may be presented automatically or upon request by the user 16-2. Either before, during, or after the message is presented to the user 16-2, the facemail client 30-2 presents the questions provided by the user 16-1 to the user 16-2. Thereafter, the facemail client 30-2 receives user input from the user 16-2 defining answers to the questions (step 232). As the answers are received, the facemail client 30-2 reveals the reward (step 234). More specifically, in one embodiment, when the user 16-2 answers a question, the facemail client 30-2 reveals the reward according to the point value assigned to the question or alternatively the point value assigned to the particular answer to the question given by the user 16-2. For example, as discussed below, the reward may be an image of the user 16-1 such as the image of the user 16-1 stored in the user account 28 of the user 16-1. At first, the image of the user 16-1 is completely distorted. After the user 16-2 answers a first question, the image of the user 16-1 becomes less distorted. As the user 16-2 continues to answer the questions, the image of the user 16-1 continues to become less distorted until finally the image of the first user 16-1 is no longer distorted. Note that, in one embodiment, the questions are assigned point values such that, regardless of the answers given by the user, the image of the user 16-1 will no longer be distorted after all of the questions are answered by the user 16-1. In another embodiment, particular answers to the questions are assigned different point values such that the image of the user 16-1 may remain completely or partially distorted depending on the particular answers given by the user 16-2. In this example, a summary of the answers given by the user 16-2 is returned to the central server 12 (step 236). The central server 12 then forwards the summary of the answers to the user device 14-1 of the user 16-1 (step 238).

In addition to the user input from the user 16-2 answering the questions, the facemail client 30-2 may receive user input from the user 16-2 defining whether the full profile of the user 16-2 or a partial profile of the user 16-2, if any, is to be sent to the user 16-1 (step 240). If the user 16-2 chooses to reveal his or her full or partial user profile to the user 16-1, the facemail client 30-2 sends the full or partial profile to the central server 12 for delivery to the user 16-1 at the user device 14-1 or instructs the central server 12 to provide the full or partial user profile of the user 16-2 to the user 16-1 at the user device 14-1 (step 242). The full or partial user profile of the user 16-2 is then sent to the user device 14-1 of the user 16-1, and presented to the user 16-1 (step 244). Note that, in an alternative embodiment, the user 16-2 may choose to reveal his or her full or partial profile to the user 16-1 as a reward in response to answering one or more questions. While not shown, at this point, the user 16-1 may choose to reveal his or her full or partial user profile to the user 16-2 if this information was not previously provided to the user 16-2 in the message, in association with the message, or as the reward.

Note that the user 16-2 may choose to respond to the message in addition to or as an alternative to revealing his or her full or partial profile to the user 16-1. If the message delivered in step 228 includes the contact information of the user 16-1 or if the contact information is provided in association with the message in step 228, any message sent from the user 16-2 to the user 16-1 in response to the message delivered in step 228 may be provided directly from the user device 14-2 to the user device 14-1 of the user 16-1 using the appropriate communication system. For example, if the contact information provided for the user 16-1 is the email address of the user 16-1, the response message may be provided by the appropriate email system. However, if the contact information of the user 16-1 is not included in the message or is not provided in association with the message, any message sent from the user 16-2 to the user 16-1 in response to the message delivered in step 228 may first be provided to the central server 12. The central server 12 may then deliver the response message to the user device 14-1 of the user 16-1.

Figure 5:
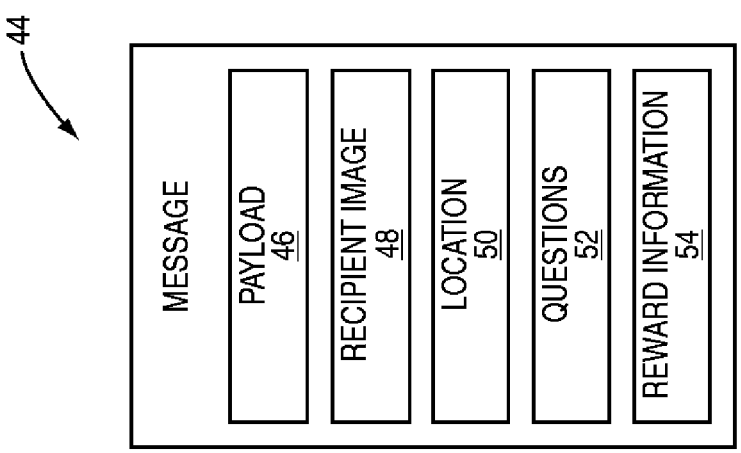
FIG. 5 illustrates an exemplary embodiment of the message sent in FIG. 4.
Figure 9:
FIGS. 9-13 illustrate reward states for additional exemplary distortion algorithms.
Figure 10:
Figure 11:
Figure 12:
Figure 13:

FIG. 5 illustrates an exemplary message 44 generated by the facemail client 30-1 and sent to the central server 12 for delivery to the intended message recipient according to the embodiment of the present invention discussed above with respect to FIG. 4. In this embodiment, the message 44 includes a payload 46. As discussed above, the payload is preferably a text message provided by the user 16-1. However, the payload 46 is not limited thereto. For example, the payload 46 may additionally or alternatively include a video message created by the user 16-1, a video clip selected by the user 16-1, a picture of the user 16-1, a picture selected by the user 16-1, or the like. The message 44 also includes a recipient image 40, which is an image of the intended message recipient, and a location 50 at which the recipient image 48 was captured. Note that, preferably, a time at which the image was captured is stored as metadata in association with the recipient image 48. For example, the time at which the recipient image 48 was captured may be stored as a tag within the corresponding image file. In addition, the message 44 of this embodiment includes questions 52 and reward information 54.

Figure 6:
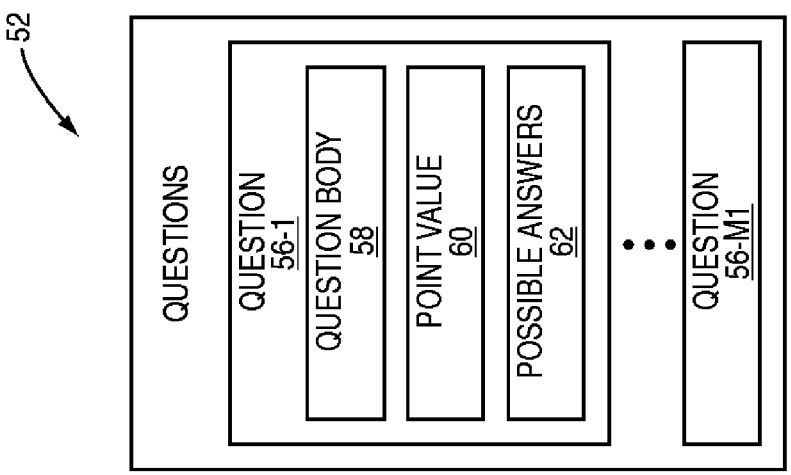
FIG. 6 illustrates an exemplary embodiment of the questions contained in the message of FIG. 5.

FIG. 6 illustrates an exemplary embodiment of the questions 52 of FIG. 5. In general, the questions 52 include a number of questions 56-1 through 56-M1. Note that there may be any number of one or more questions. The question 56-1 includes a question body 58, a point value 60, and optionally a list of possible answers 62. The question body 58 includes the text forming the question. For example, the question body 58 may provide the text "Who is your favorite music artist or band?". The point value 60 is a point value assigned to the question 56-1. The point value 60 is preferably assigned to the question 56-1 by the user asking the question, which, in the example above, is the user 16-1. Alternatively, the point value 60 may be system-defined. The question 56-1 may also include a list of possible answers 62. For example, if the question 56-1 is a multiple choice question, the list of possible answers 62 includes answers for the multiple choice question. Note that, if there is a list of possible answers 62, the user asking the question may assign different point values to each of the possible answers. In this manner, the reward may be revealed differently depending on the answers given by the intended message recipient. Alternatively, one or more desired answers to the question 56-1 may be defined. Different point values may be assigned to the desired answers as compared to any other answer such that the reward is revealed differently depending on whether the intended message recipient gives a desired answer as opposed to any other answer. Similarly, while not illustrated, the questions 56-2 through 56-M1 each includes a question body, point value, and possible answers.

Figure 7:
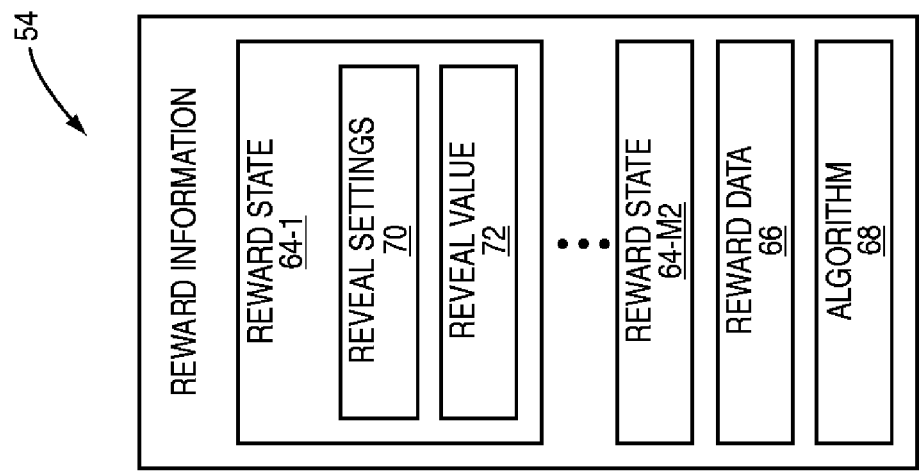
FIG. 7 illustrates an exemplary embodiment of the reward information contained in the message of FIG. 5.

FIG. 7 illustrates an exemplary embodiment of the reward information 54 of FIG. 5. The reward information includes a number of reward states 64-1 through 64-M2, reward data 66, and an algorithm 68 for revealing the reward data 66 according to the reward states 64-1 through 64-M2. The reward states 64-1 through 64-M2 each includes reveal settings 70 and a reveal value 72. The reveal settings 70 and the reveal value 72 are inputs to the algorithm 68 to control the revealing of the reward data 66. The selection of the reward state 64-1 through 64-M2 is preferably controlled based on the point value 60 or an accumulated point value for the questions 56-1 through 56-M1 answered by the intended message recipient.

In one embodiment, the number of reward states M2 is equal to a total number of points that may be accumulated by answering the questions 56-1 through 56-M1. In one embodiment, the total number of points that may be accumulated is the sum of the point values 60 of the questions 56-1 through 56-M1. The reveal values 72 of the reward states 64-1 through 64-M2 correspond to potential accumulated point values. For example, if the total number of points that may be accumulated by answering questions 56-1 through 56-M1 is ten (10), then there may be eleven (11) reward states 64-1 through 64-11 with reveal values 72 of zero (0) through (10), respectively. The reveal settings 70 of the reward states 64-1 through 64-11 are inputs to the algorithm 68 and control the revealing of the reward data 66. Thus, if the reward data 66 is an image of the sender of the message, the algorithm 68 may be an algorithm for distorting the image. The reveal settings 70 for each reward state 64-1 through 64-11 control the amount of distortion, with the reward state 64-1 causing a maximum distortion, the reward state 64-11 causing a minimum or no distortion, and the reward states 64-2 through 64-10 causing intermediate levels of distortion. Thus, before any questions are answered by the intended message recipient, the reward is in the reward state 64-1 such that the image, or reward data 66, is presented with a maximum amount of distortion. After the intended message recipient answers the first question 56-1, the point value 60 for the first question 56-1 is used to select one of the reward states 64-1 through 64-11 having a reveal value 72 corresponding to the point value 60 of the first question 56-1. After the intended message recipient answers the second question 56-2, the sum of the point values 60 of the first and second questions 56-1 and 56-2 is used to select one of the reward states 64-1 through 64-11 having a reveal value 72 corresponding to the sum of the point values 60 of the first and second questions 56-1 and 56-2. The process continues to reveal the reward data 66 as the intended message recipient answers the questions 56-1 through 56-10.

FIG. 8A illustrates the reveal settings 70 in an embodiment where there are three reward states 64-1 through 64-3, the reward data 66 is an image, and the algorithm 68 is an algorithm for scrambling or distorting the image. As shown, the image is divided into a number of blocks numbered one (1) through sixteen (16). The reveal settings 70 provide the arrangement of the blocks of the image. The corresponding versions of the image, or reward data 66, provided by the algorithm 68 for each of the reward states 64-1 through 64-3 are illustrated in FIG. 8B. As shown, in the reward state 64-1, the image is severely distorted. In the reward state 64-2, the image is less distorted. Lastly, in the reward state 64-3, the image is non-distorted or has no distortion. FIGS. 9 through 13 illustrate exemplary alternative algorithms for distorting the image of FIG. 8. Note that the examples given above with respect to FIGS. 8A, 8B, and 9-13 are exemplary and not intended to limit the scope of the present invention.

Figure 14C:
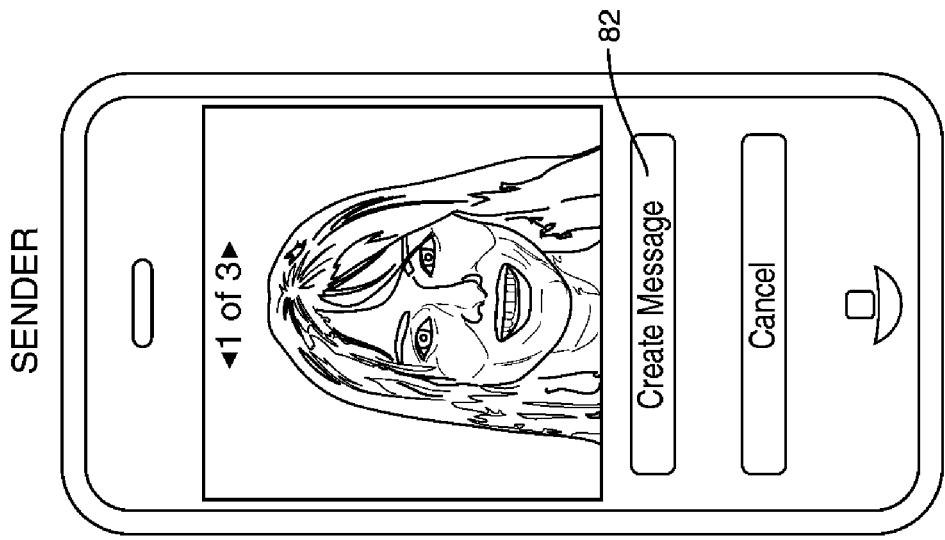
Figure 14B:
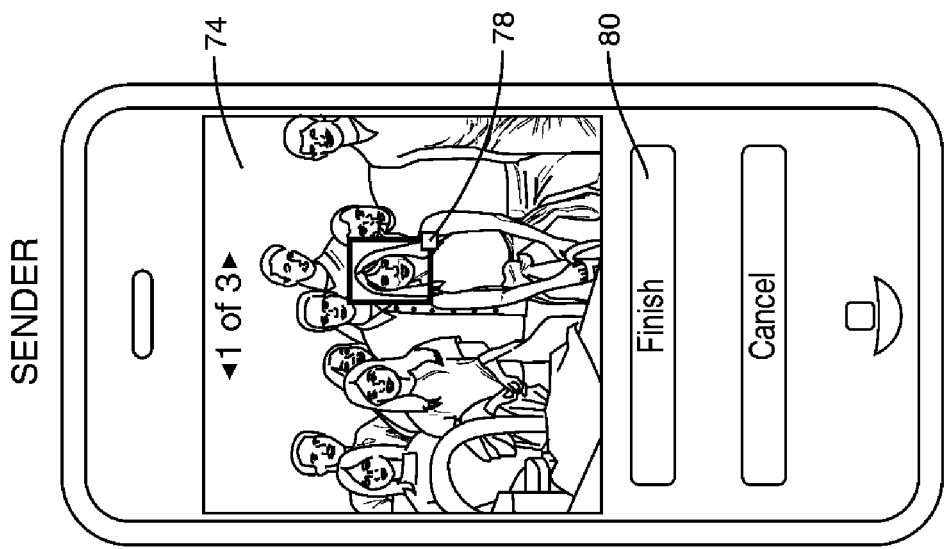
Figure 14A:
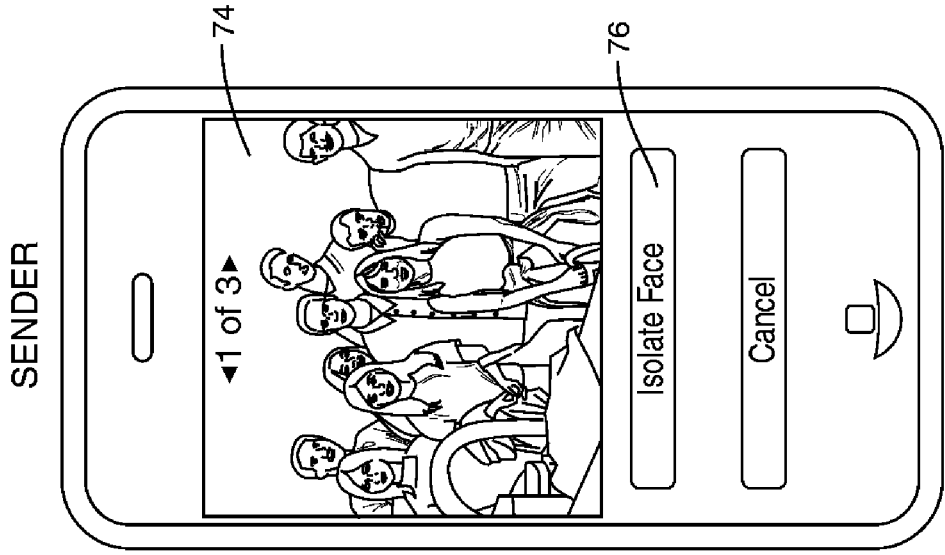

FIGS. 14A through 14I graphically illustrate the process of FIG. 4 according to one embodiment of the present invention. For this example, again assume that the user 16-1 is the user sending the message, the user 16-2 is identified as the intended message recipient, and that users 16-3 and 16-4 are friends of the user 16-2. FIG. 14A illustrates an initial state after the user 16-1 has captured or otherwise obtained an image 74. In this example, the image 74 is an image of a group of users. In order to create an image of the intended message recipient, the user 16-1 selects an "isolate face" button 76 in order to initiate a cropping process. As shown in FIG. 14B, in response to user input from the user 16-1 selecting the "isolate face" button 76, the user 16-1 is enabled to control a selection tool 78 in order to select the intended message recipient from the image 74. After positioning the selection tool 78, the user 16-1 selects a "finish" button 80. In response, the image of the intended message recipient is created.

Next, as shown in FIG. 14C, the image of the intended message recipient is then presented to the user 16-1. The user 16-1 may then select a "create message" button 82 in order to initiate the process of creating a message to be sent to the intended message recipient. As shown in FIG. 14D, in this example, the user 16-1 then creates a text message to be provided as the payload of the message to be sent to the intended message recipient. A "clear" button 84 enables the user 16-1 to clear the message. Once the text message is complete, the user 16-1 may select a "next" button 86 to proceed to the next step. As shown in FIG. 14E, in this example, the next step is for the user 16-1 to select a manner in which the reward data, which in this example is an image of the user 16-1, is to be revealed to the intended message recipient. The manner in which the reward data is to be revealed corresponds to the algorithm to be used to reveal the reward data. In this example, the user 16-1 may choose to blur his or her image, apply a cartoon effect to his or her image, apply a glass effect to his or her image, apply a twirl effect to his or her image, or the like. In addition, in this example, the user 16-1 may select a "select style of reward data" button 88 in order to change the style, or type, of reward data. For example, the user 16-1 may choose to switch the reward data from being an image of the user 16-1 or being a full or partial profile of the user 16-1. The user 16-1 may then select a "send message" button 90 to send the message. Note that, while not shown, the user 16-1 may also be enabled to create or select questions to be asked in order to reveal the image of the user 16-1 to the intended message recipient, as discussed above.

After the message is sent, the central server 12 performs an image matching process to identify the intended message recipient, as discussed above. In this example, the intended message recipient is identified as the user 16-2, where the user 16-2 has a username "Naomi123." As shown in FIG. 14F, the central server 12 then sends the image of the intended message recipient as well as a line-up 92 of the images from the user accounts 28 of the user 16-2 and other users from the users 16-3 through 16-N that most closely match the image of the intended message recipient to the friends of the user 16-2. In order to verify the intended message recipient, each friend selects an image from the line-up 92 matching the image of the intended message recipient and selects a "verify" button 94. If the image selected by the friend is the image of the user 16-2, then the user 16-2 is verified as the intended message recipient. The friend may also be enabled to respond to the user 16-1 sending the message, which in this example has the username "Hal101," by selecting a "Respond to Hal101"

button 96. The friend may also be enabled to send a warning message to the intended message recipient, which is the user 16-2, by selecting a "send warning to Naomi123" button 98.

As illustrated in FIG. 14G, once verification is complete, the central server 12 sends the message including the questions to be asked in order to reveal the reward data to the user device 14-2 of the intended message recipient, which is the user 16-2. The user 16-2 may choose to answer the questions by selecting an "answer questions" button 100 or decline to answers the questions by selecting a "decline" button 102. Assuming that the user 16-2 has chosen to answer the questions, the image of the user 16-1 is revealed as the user 16-2 answers the questions, as illustrated in FIG. 14H. Also, the user 16-2 may choose to reveal her full profile to the user 16-1 by selecting a "reveal full profile" button 104 or reveal her partial profile to the user 16-1 by selecting a "reveal partial profile" button 106. In this example, the user 16-2 has chosen to share her partial profile with the user 16-1, where the partial profile includes the image of the user 16-2 from the user account 28 of the user 16-2, as illustrated in FIG. 14I. The user 16-1 may then choose to respond to the user 16-2 by selecting a "respond to Naomi" button 108. Preferably, at this point, the users 16-1 and 16-2 have exchanged contact information and may communicate via traditional communication means such as email, instant messaging, text messaging, telephone call, or the like. Alternatively, the central server 12 may continue to enable communication between the users 16-1 and 16-2 where messages are addressed using, for example, the usernames of the users 16-1 and 16-2.

FIG. 15 illustrates the system 10 according to another embodiment of the present invention. The system 10 of FIG. 15 is substantially the same as that discussed above. However, in this embodiment, the central server 12 also includes a question selection function 110, a question database 112, and an answer recommendation function 114. The question selection function 110 may be implemented in software, hardware, or a combination thereof. As discussed below, the question selection function 110 generally operates to select one or more questions 116 from the question database 112 to ask an intended message recipient based on common interests of the sender of the message and the intended message recipient. The question database 112 generally stores a collection of questions 116 to be used by all of the users 16-1 through 16-N. Alternatively, each of the users 16-1 through 16-N may create or select a collection of questions 116 that are stored within or in association with the user accounts 28 of the users 16-1 through 16-N. In this alternative embodiment, when, for example, the user 16-1 creates a message to send to an intended message recipient, questions to ask the intended message recipient are selected from the questions 116 stored in or associated with the user account 28 of the user 16-1 based on common interests of the user 16-1 and the intended message recipient. The answer recommendation function 114 may also be implemented in software, hardware, or a combination thereof. As discussed below, the answer recommendation function 114 operates to suggest answers to questions sent to intended message recipients based on previous answers given by the intended message recipients to the same or similar questions, information stored in the user accounts 28 of the intended message recipients such as the user profiles of the intended message recipients, or usage information or statistics such as play histories of the intended message recipients, recent purchases made by the intended message recipients, web browsing history, or the like. Note that the answer recommendation function 114 may also be used in conjunction with the embodiment of the system 10 discussed above with respect to FIGS. 1 and 2.

FIG. 16 illustrates an exemplary embodiment of a question 116 stored in the question database 112 of FIG. 15. In general, the question 116 includes a question body 118, one or more keywords 120, a point value 122, and optionally a list of possible answers 124. The question body 118 includes the text forming the question. For example, the question body 118 may provide the text "Who is your favorite music artist or band?". The one or more keywords 120 define a topic of the question 116 or describe the subject matter of the question 116. The point value 122 is a point value assigned to the question 116. The point value 122 may be a system-defined point value. Alternatively, the point value 122 may be independently assigned for each user 16-1 through 16-N. The list of possible answers 124 provides a list of possible answers where, for example, the question 116 is a multiple choice question. Also note that, in an alternative embodiment, different point values may be assigned to each of the possible answers rather than assigning a single point value 122 to the question. This may be particularly beneficial where point values are assigned to the question 116 independently for each of the users 16-1 through 16-N.

FIGS. 17A and 17B illustrate the operation of the system 10 of FIG. 15 according to one embodiment of the present invention. First, the user devices 14-1 through 14-4, or alternatively the users 16-1 through 16-4, register with the central server 12 (steps 300-306). As discussed above, during registration, the user accounts 28 of the users 16-1 through 16-4 are created. Next, the user devices 14-1 through 14-4 provide their locations, or location information, to the central server 12 (steps 308-314). Again, the user devices 14-1 through 14-4 may send their locations to the central server 12 automatically. As an alternative, the central server 12 may poll the user devices 14-1 through 14-4 for their locations periodically or as otherwise desired. The locations of the user devices 14-1 through 14-4 are stored in the user accounts 28 of the corresponding users 16-1 through 16-4. The current locations of the user devices may be stored as the current locations of the users 16-1 through 16-4. In addition, historical records of the locations of the users 16-1 through 16-4 may be stored in the corresponding user accounts 28. At this point, in this example, the user device 14-1, and more specifically the image capture device 32-1, captures an image of an intended message recipient (step 316). As discussed above, in an alternative embodiment, the image of the intended message recipient may be obtained from a secondary source such as, for example, a photo sharing website or application, a website, an email attachment of an email from a friend, or the like.

Next, a message to the intended message recipient is generated (step 318). More specifically, the user 16-1 may initiate the generation of the message to the intended message recipient and specify a payload for the message. The payload of the message is preferably a text message. However, the present invention is not limited thereto. In addition, the user 16-1 addresses the message using the image of the intended message recipient. As discussed above, in one embodiment, cropping or similar processing may be utilized to provide the image of the intended message recipient as a portrait of the intended message recipient.

The user device 14-1, and more specifically the facemail client 30-1, then sends the message including the image of the intended message recipient to the central server 12 (step 320). Note that preferably, other than the image of the intended message recipient, no other contact information (e.g., email address, username, telephone number, etc.) of the intended message recipient is known by the user 16-1. The message is addressed to the intended message recipient using only or essentially the image of the intended message recipient. Also note that the location and time at which the image of the intended message recipient was captured may also be provided as part of the message or, alternatively, in association with the image of the intended message recipient such as in ID3 tags of the corresponding image file.

As discussed above, upon receiving the message from the user device 14-1, the central server 12 performs an image matching process to identify the intended message recipient (step 322). In this example, the user 16-2 again is identified as the intended message recipient. Once the user 16-2 is identified as the intended message recipient, the facemail delivery function 20 of the central server 12 may interact with friends of the user 16-2 to verify that the user 16-2 is the intended message recipient (steps 324 and 326). In this example, the users 16-3 and 16-4 of the user devices 14-3 and 14-4, respectively, are identified in the friends list of the user 16-2.

Assuming that the user 16-2 is verified as the intended message recipient, the facemail delivery function 20 of the central server 12 then correlates interests of the users 16-1 and 16-2 to determine one or more keywords for selecting questions to ask the user 16-2 (step 328). More specifically, in one embodiment, the user accounts 28 of the users 16-1 through 16-N also store keywords, or interest keywords, expressing interests of the users 16-1 through 16-N, respectively. As such, the question selection function 110 of the central server 12 correlates the interest keywords of the users 16-1 and 16-2 to identify common interest keywords. The question selection function 110 then selects one or more questions 116 of the question database 112 having keywords 120 (FIG. 16) matching the common interest keywords of the users 16-1 through 16-N (step 330). Note that the number of questions 116 selected may be configurable by the user 16-1, system-defined, or the like.

As illustrated in FIG. 17B, in this embodiment, the central server 12 then sends the selected questions 116 to the user device 14-1 (step 332). The user 16-1 may then be enabled to approve the questions 116 selected by the question selection function 110 of the central server 12, select one or more of the questions 116 selected by the question selection function 110 to ask the user 16-2, modify or edit the questions 116 selected by the question selection function 110, or the like. The user device 14-1 then sends a response to the central server 12 (step 334). The response may approve the questions 116 selected by the question selection function 110 of the central server 12, identify a sub-set of the questions 116 selected by the question selection function 110 to ask the user 16-2, include any modifications or edits to the questions 116 selected by the question selection function 110, or the like. In addition, if the central server 12 does not already have the reward information for the message to be sent to the user 16-2, then the reward information may be provided at this time. Again, in one embodiment, the reward information includes one or more reward states, reward data, and an algorithm, as discussed above. The reward data and/or algorithm may be selected by the user 16-1 or system-defined.

In addition, the answer recommendation function 114 may suggest answers to one or more of the questions 116 to be included in the message sent to the user 16-2 (step 336). In one embodiment, answers to previous questions answered by the user 16-2 are stored in the user account 28 of the user 16-2. Thus, if any of the questions 116 included in the message have previously been answered by the user 16-2, the answer recommendation function 114 may provide the previous answers given the user 16-2 as suggested answers to the corresponding questions 116. In addition or alternatively, if any of the questions 116 can be answered using information stored in the user account 28 of the user 16-2 and specifically stored in the user profile of the user 16-2, then the answer recommendation function 114 may obtain suggested answers for those questions from the user account 28 of the user 16-2. For example, if one of the questions 116 asks "What school do you attend?", then the answer recommendation function 114 may obtain this information from the user profile of the user 16-2 and suggest an answer accordingly. Still further, the user account 28 of the user 16-2 may include usage or historical information such as, for example, a play history identifying songs or other media items played by the user 16-2, a purchase history identifying recent purchases made by the user 16-2, a web browsing history of the user 16-2, a listing of events such as concerts attended by the user 16-2, a listing of movies recently seen by the user 16-2, or the like. Thus, as an example, if a question 116 asks "Who is your favorite music artist or band?", then the answer recommendation function 114 analyzes a play history of the user 16-2 and/or a historical record of music purchases made by the user 16-2 to suggest an answer to the question 116. A list of exemplary questions 116 and the manner in which the answer recommendation function 114 may suggest answers to those questions is provided in FIG. 18. The list also includes the point value 122 and the one or more keywords 120 for each question 116. Note, however, in this example, the questions 116 do not include possible answers 124.

Returning to FIG. 17B, at this point, the selected questions 116, or a modified set thereof, the reward information, and the suggested answers are appended to or inserted into the message to be provided to the intended message recipient, which in this example is the user 16-2. The facemail delivery function 20 of the central server 12 then sends the message including the questions, reward information, and suggested answers to the user device 14-2 of the user 16-2 (step 338). Once the message is received at the user device 14-2, the facemail client 30-2 presents the message to the user 16-2 at the user device 14-2 (step 340). The message may be presented automatically or upon request by the user 16-2. Either before, during, or after the message is presented to the user 16-2, the facemail client 30-2 presents the questions to the user 16-2. Thereafter, the facemail client 30-2 receives user input from the user 16-2 defining answers to the questions (step 342). As the answers are received, the facemail client 30-2 reveals the reward data from the reward information, as discussed above (step 344). In this example, a summary of the answers given by the user 16-2 is returned to the central server 12 (step 346). The central server 12 then forwards the summary of the answers to the user device 14-1 of the user 16-1 (step 348).

While not illustrated, in addition to the user input from the user 16-2 answering the questions, the facemail client 30-2 may receive user input from the user 16-2 defining whether the full profile of the user 16-2 or a partial profile of the user 16-2, if any, is to be sent to the user 16-1, as discussed above. If the user 16-2 chooses to reveal his or her full or partial user profile to the user 16-1, the facemail client 30-2 sends the full or partial profile to the central server 12 for delivery to the user 16-1 at the user device 14-1 or instructs the central server 12 to provide the full or partial user profile of the user 16-2 to the user 16-1 at the user device 14-1. The full or partial user profile of the user 16-2 is then sent to the user device 14-1 of the user 16-1, and presented to the user 16-1. Note that, in an alternative embodiment, the user 16-2 may choose to reveal his or her full or partial profile to the user 16-1 as a reward in response to answering one or more questions. While not shown, at this point, the user 16-1 may choose to reveal his or her full or partial user profile to the user 16-2 if this information was not previously provided to the user 16-2 in the message, in association with the message, or as the reward.

Note that the user 16-2 may choose to respond to the message in addition to or as an alternative to revealing his or her full or partial profile to the user 16-1. If the message delivered in step 338 includes the contact information of the user 16-1 or if the contact information is provided in association with the message in step 338, any message sent from the user 16-2 to the user 16-1 in response to the message delivered in step 338 may be provided directly from the user device 14-2 to the user device 14-1 of the user 16-1 using the appropriate communication system. For example, if the contact information provided for the user 16-1 is the email address of the user 16-1, the response message may be provided by the appropriate email system. However, if the contact information of the user 16-1 is not included in the message or is not provided in association with the message, any message sent from the user 16-2 to the user 16-1 in response to the message delivered in step 338 may first be provided to the central server 12. The central server 12 may then deliver the response message to the user device 14-1 of the user 16-1.

FIG. 19 is a block diagram of the central server 12 according to one embodiment of the present invention. In general, the central server 12 includes a control system 126 having associated memory 128. In this embodiment, the facemail delivery function 20, image matching function 22, and the location tracking function 24 (FIGS. 1 and 15) are implemented in software and stored in the memory 128. In addition, if included, the question selection function 110 and the answer recommendation function 114 (FIG. 15) may also be implemented in software and stored in the memory 128. However, the present invention is not limited thereto. The facemail delivery function 20, the image matching function 22, the location tracking function 24, the question selection function 110, and the answer recommendation function 114 may be implemented in software, hardware, or a combination thereof. The central server 12 may also include one or more digital storage devices 130 such as, for example, one or more hard disk drives. The one or more digital storage devices 130 may be used to store the user accounts database 26 (FIGS. 1 and 15) and the question database 112 (FIG. 15). The central server 12 also includes a communication interface 132 communicatively coupling the central server 12 to the network 18 (FIGS. 1 and 15). Lastly, the central server 12 may include a user interface 134, which may include components such as a display, one or more user input devices, or the like.

FIG. 20 is a block diagram of the user device 14-1 according to one embodiment of the present invention. This discussion is equally applicable to the other user devices 14-2 through 14-N. In general, the user device 14-1 includes a control system 136 having associated memory 138. In this embodiment, the facemail client 30-1 (FIGS. 1 and 15) is implemented in software and stored in the memory 138. However, the present invention is not limited thereto. The facemail client 30-1 may be implemented in software, hardware, or a combination thereof. The user device 14-1 also includes the image capture device 32-1 and the location determination function 34-1. The user device 14-1 may also include one or more digital storage devices 140 such as, for example, one or more hard disk drives. The user device 14-1 also includes a communication interface 142 communicatively coupling the user device 14-1 to the network 18 (FIGS. 1 and 15). Lastly, the user device 14-1 may include a user interface 144, which may include components such as a display, one or more user input devices, or the like.

Those skilled in the art will recognize improvements and modifications to the preferred embodiments of the present invention. All such improvements and modifications are considered within the scope of the concepts disclosed herein and the claims that follow.

What is claimed is:

1. A method comprising:
   receiving, by a server, a message including an image of an intended message recipient of the message from a first user device of a first user;
   after the server receives the message, performing an image matching process to match the image of the intended message recipient to an image of one of the at least one user, wherein an image of the second user matches the image of the intended message recipient such that the second user is identified as the intended message recipient; and
   comparing a location and time at which the image of the intended message recipient was captured to historical location information for the second user to verify that the second user was at or near the location at which the image of the intended message recipient was captured at the time that the image of the intended message recipient was captured; and
   delivering the message to a second user device of the second user in response to verifying that the second user was at or near the location at which the image of the intended message recipient was captured at the time that the image of the intended message recipient was captured and without communicating contact information of the second user to the first user device prior to delivering the message.

2. The method of claim 1 wherein the message is addressed to the intended message recipient using only the image of the intended message recipient.

3. The method of claim 1 wherein the message is not addressed to the intended message recipient using text or numbers.

4. The method of claim 1 wherein the message is addressed to the intended message recipient using the image of the intended message recipient.

5. The method claims of claim 1, providing the image of the intended message recipient to at least one user identified as a friend of the second user for verification that the second user is the intended message recipient.

6. The method of claim 1 wherein delivering the message to the second user device of the second user comprises:
   obtaining the contact information for the second user identified as the intended message recipient; and
   delivering the message to the second user at the second user device based on the contact information.

7. The method of claim 1, wherein the historical location information for the second user comprises a historical record of a plurality of locations of the second user.

8. The method of claim 1 wherein the message received from the first user device comprises at least one question to ask the intended message recipient and a reward to be revealed to the intended message recipient upon answering the at least one question.

9. The method of claim 8 wherein the at least one question is defined by the first user.

10. The method of claim 8 wherein the reward comprises at least one of a group consisting of: an image of the first user, a full profile of the first user, a partial profile of the first user, and contact information for the first user.

11. The method of claim 8 further comprising providing a suggested answer to the at least one question for the intended message recipient.

12. The method of claim 1 further comprising:
automatically selecting at least one question from a plurality of questions to ask the intended message recipient on behalf of the first user; and
providing the at least one question to the second user at the second user device.

13. The method of claim 12 wherein automatically selecting the at least one question comprises:
correlating interests of the first user and interests of the second user to determine at least one common interest of the first user and the second user; and
selecting the at least one question from the plurality of questions based on the at least one common interest.

14. The method of claim 12 wherein a reward is revealed to the intended message recipient in response to answering the at least one question.

15. The method of claim 14 wherein the reward comprises at least one of a group consisting of: an image of the first user, a full profile of the first user, a partial profile of the first user, and contact information for the first user.

16. The method of claim 12 further comprising suggesting an answer to a question of the at least one question to the intended message recipient.

17. The method of claim 16 wherein suggesting the answer to the question comprises suggesting a previous answer given to the question by the second user as the answer to the question.

18. The method of claim 16 wherein suggesting the answer to the question comprises suggesting the answer to the question based on information stored in a user profile of the second user.

19. The method of claim 16 wherein suggesting the answer to the question comprises suggesting the answer to the question based on historical usage information for the second user.

20. A central server comprising:
a communication interface communicatively coupling the central server to a plurality of user devices of a plurality of users; and
a control system associated with the communication interface, wherein the control system is executable on at least one microprocessor and is operably configured to:
receive a message including an image of an intended message recipient of the message from a first user device of the plurality of user devices of a first user of the plurality of users;
after the control system of the central server receives the message, identify a second user from the plurality of users as the intended message recipient based on the image of the intended message recipient;
perform an image matching process to match the image of the intended message recipient to an image of one of the at least one user, wherein an image of the second user matches the image of the intended message recipient such that the second user is identified as the intended message recipient; and
compare a location and time at which the image of the intended message recipient was captured to historical location information for the second user to verify that the second user was at or near the location at which the image of the intended message recipient was captured at the time that the image of the intended message recipient was captured; and
deliver the message to a second user device of the plurality of user devices of the second user in response to verifying that the second user was at or near the location at which the image of the intended message recipient was captured at the time that the image of the intended message recipient was captured and without communicating contact information of the second user to the first user device prior to delivering the message.

21. The central server of claim 20, wherein the historical location information for the second user comprises historical record of a plurality of locations of the second user.

22. A non-transitory computer readable medium that stores computer executable instructions for instructing at least one microprocessor to:
receive, by a server, a message including an image of an intended message recipient of the message from a first user device of a first user;
after the server receives the message, identify a second user as the intended message recipient based on the image of the intended message recipient;
perform an image matching process to match the image of the intended message recipient to an image of one of the at least one user, wherein an image of the second user matches the image of the intended message recipient such that the second user is identified as the intended message recipient; and
compare a location and time at which the image of the intended message recipient was captured to historical location information for the second user to verify that the second user was at or near the location at which the image of the intended message recipient was captured at the time that the image of the intended message recipient was captured; and
deliver the message to a second user device of the second user in response to verifying that the second user was at or near the location at which the image of the intended message recipient was captured at the time that the image of the intended message recipient was captured and without communicating contact information of the second user to the first user device prior to delivering the message.

* * * * *